United States Patent
Sankaran et al.

(10) Patent No.: US 10,422,671 B2
(45) Date of Patent: Sep. 24, 2019

(54) SELF-CHARGING WATER USAGE MONITOR, SYSTEMS, AND METHODS

(71) Applicant: Ketos Inc., San Jose, CA (US)

(72) Inventors: Meena Sankaran, San Jose, CA (US); Mazhar N. Ali, Halle (DE)

(73) Assignee: Ketos Inc., San Jose, CA (US)

( * ) Notice: Subject to any disclaimer, the term of this patent is extended or adjusted under 35 U.S.C. 154(b) by 0 days.

(21) Appl. No.: 15/752,229

(22) PCT Filed: May 23, 2017

(86) PCT No.: PCT/US2017/034043
§ 371 (c)(1),
(2) Date: Feb. 12, 2018

(87) PCT Pub. No.: WO2017/205404
PCT Pub. Date: Nov. 30, 2017

(65) Prior Publication Data
US 2019/0219426 A1    Jul. 18, 2019

Related U.S. Application Data

(60) Provisional application No. 62/341,002, filed on May 24, 2016.

(51) Int. Cl.
*G08B 23/00* (2006.01)
*G01F 1/34* (2006.01)
(Continued)

(52) U.S. Cl.
CPC .................. *G01F 1/34* (2013.01); *F17C 5/06* (2013.01); *F17D 1/08* (2013.01); *G01F 1/05* (2013.01);
(Continued)

(58) Field of Classification Search
CPC ...... G01F 1/34; G01F 1/07; G01F 1/11; G01F 15/063; G01F 15/075; G01M 3/2815
(Continued)

(56) References Cited

U.S. PATENT DOCUMENTS

| | | |
|---|---|---|
| 4,936,151 A | 6/1990 | Tokio |
| 5,721,383 A | 2/1998 | Franklin |

(Continued)

FOREIGN PATENT DOCUMENTS

| | | |
|---|---|---|
| CN | 201251458 | 6/2009 |
| CN | 204286507 | 4/2015 |

(Continued)

OTHER PUBLICATIONS

International Search Report and Written Opinion for PCT Application No. PCT/US2017/34043, dated Aug. 17, 2017, in 14 pages.

*Primary Examiner* — Naomi J Small
(74) *Attorney, Agent, or Firm* — Cooley LLP

(57) ABSTRACT

A water usage monitor can include a housing having a fluid flow path, a fluid inlet in fluid communication with the fluid flow path, and a fluid outlet in fluid communication with the fluid flow path. The housing can include a dry housing interior fluidly isolated from the fluid flow path. The monitor preferably includes a power generator configured to generate a voltage when fluid flows through the fluid flow path and at least one sensor configured to measure at least one characteristic of a fluid flowing through the fluid flow path. The monitor can include a signal generator configured transmit signals from the power generator and from the at least one sensor to a remote processor. The power generator can be configured to power both the at least one sensor and the signal generator in response to fluid flow through the fluid flow path.

14 Claims, 18 Drawing Sheets

(51) Int. Cl.

| | | |
|---|---|---|
| *G01F 1/05* | (2006.01) | |
| *G01F 1/06* | (2006.01) | |
| *G01F 1/07* | (2006.01) | |
| *G01F 1/10* | (2006.01) | |
| *G01F 1/11* | (2006.01) | |
| *G01F 15/06* | (2006.01) | |
| *G01F 15/07* | (2006.01) | |
| *G01F 15/075* | (2006.01) | |
| *F17D 1/08* | (2006.01) | |
| *F17C 5/06* | (2006.01) | |
| *G01M 3/28* | (2006.01) | |

(52) U.S. Cl.
CPC .................. *G01F 1/06* (2013.01); *G01F 1/07* (2013.01); *G01F 1/10* (2013.01); *G01F 1/11* (2013.01); *G01F 15/06* (2013.01); *G01F 15/063* (2013.01); *G01F 15/07* (2013.01); *G01F 15/075* (2013.01); *G01M 3/2815* (2013.01)

(58) Field of Classification Search
USPC .................................................. 340/870.02
See application file for complete search history.

(56) References Cited

U.S. PATENT DOCUMENTS

| | | | |
|---|---|---|---|
| 7,508,318 B2 | 3/2009 | Casella et al. | |
| 7,742,883 B2 | 6/2010 | Dayton | |
| 8,279,080 B2 | 10/2012 | Pitchford et al. | |
| 8,347,427 B2* | 1/2013 | Klicpera | B05B 12/008 4/643 |
| 9,574,923 B2 | 2/2017 | Williamson et al. | |
| 2006/0245467 A1* | 11/2006 | Casella | G01D 4/002 374/41 |
| 2009/0194719 A1* | 8/2009 | Mulligan | E03B 7/071 251/129.01 |
| 2010/0085211 A1* | 4/2010 | Wang | G01F 1/10 340/870.02 |
| 2011/0179880 A1 | 7/2011 | Bratkovski | |
| 2013/0088015 A1* | 4/2013 | Walton | F03B 1/00 290/54 |
| 2013/0298695 A1 | 11/2013 | Kuhlemann et al. | |
| 2013/0333764 A1 | 12/2013 | Wright | |
| 2014/0084075 A1* | 3/2014 | Vandelli | G01F 15/005 239/1 |
| 2014/0165719 A1* | 6/2014 | Williamson | G01F 1/06 73/272 R |
| 2015/0308084 A1 | 10/2015 | Kohler | |
| 2015/0379858 A1 | 12/2015 | Wetherill et al. | |
| 2016/0041019 A1* | 2/2016 | Hannon | G01F 15/063 702/45 |

FOREIGN PATENT DOCUMENTS

| | | |
|---|---|---|
| CN | 205228560 | 5/2016 |
| WO | WO2017/060872 | 4/2017 |

* cited by examiner

SELF-CHARGING WATER USAGE MONITOR, SYSTEMS, AND METHODS

CROSS-REFERENCE TO RELATED APPLICATIONS

This application is a U.S. National Phase of PCT/US2017/034043, having an international filing date of May 23, 2017, designating the United States, and titled SELF-CHARGING WATER USAGE MONITOR, SYSTEMS, AND METHODS, which claims the benefit of U.S. Provisional Patent Application No. 62/341,002, filed May 24, 2016 and entitled SELF-RECHARGING DEVICE, the entire disclosures of which are hereby incorporated by reference.

TECHNICAL FIELD

Certain embodiments herein related to devices, systems, and methods related to monitoring water usage.

DISCUSSION OF THE RELATED ART

Water usage monitors are useful for monitoring the amount of water used in a specific environment or application. Such monitors can measure flow rate through a pipe or other flow path.

SUMMARY

A water usage monitor can include a housing. The housing can have a fluid flow path, a fluid inlet in fluid communication with the fluid flow path and configured to facilitate fluid communication between a fluid source and the fluid flow path and a fluid outlet in fluid communication with the fluid flow path at an end of the fluid flow path opposite the fluid inlet. The fluid outlet can be configured to facilitate outflow of fluid from the fluid flow path to an exterior of the housing. The housing can include a dry housing interior fluidly isolated from the fluid flow path. In some embodiments, the water usage monitor includes a power generator positioned at least partially in the fluid flow path. The power generator can be configured to generate a voltage when fluid flows through the fluid flow path from the fluid inlet. In some embodiments, the water usage monitor includes at least one sensor positioned at least partially within the dry housing and configured to measure at least one characteristic of a fluid flowing through the fluid flow path. The water usage monitor can include a signal generator operably connected to the power generator and to the at least one sensor. The signal generator can be configured transmit signals from the power generator and from the at least one sensor to a remote processor. In some embodiments, the power generator is configured to power both the at least one sensor and the signal generator in response to fluid flow through the fluid flow path. In some embodiments, the power generator is configured to output signals usable for calculating flow rate of fluid through the flow path. In some embodiments, the power generator is configured to generate a voltage indicative of fluid flow rate through the fluid flow path.

In some embodiments, the power generator is a turbine. In some embodiments, the turbine is configured to rotate about an axis of rotation in response to fluid flow through the fluid flow path. In some embodiments, the axis of rotation of the turbine is perpendicular to the fluid flow path. In some embodiments, the turbine includes a plurality of turbine blades and, at any instant in time, only a subset of the plurality of turbine blades are positioned in the fluid flow passage.

In some embodiments, the fluid flow path includes an expansion region having an upstream end and a downstream end having a larger cross-sectional area than the upstream end of the expansion region. In some embodiments, one or more of the subset of the plurality of blades are positioned in the expansion region.

In some embodiments, the upstream end of the expansion region is positioned such that a line perpendicular to a centerline of the fluid flow path can pass through both the upstream end of the expansion region and the axis of rotation of the turbine.

In some embodiments, fewer than 30% of the turbine blades are positioned in the fluid flow passage at any instant in time during operation of the water usage monitor.

In some embodiments, the fluid inlet has a cross-sectional area substantially equal to a cross-sectional area of the fluid outlet.

In some embodiments, there is only a single fluid flow path through the housing.

In some embodiments, the at least one sensor is a pressure sensor is configured to measure pressure in the fluid flow path.

In some embodiments, the at least one sensor is a turbine that also functions as the power generator.

A water monitoring system can include one or more network hubs. The water monitoring system can include a plurality of the water usage monitors described above. In some embodiments, the water monitoring system includes a network of distributed servers hosted on the internet and configured to bilaterally communicate with the plurality of water usage monitors through the one or more network hubs. In some embodiments, the plurality of water usage monitors are configured to wirelessly communicate with each other and with the one or more network hubs. In some embodiments, at least two of the plurality of water usage monitors are configured to wirelessly communicate flow data to the one or more network hubs. In some embodiments, the network of distributed servers hosted on the internet is configured to calculate water flow rate from the flow data communicated from the at least two water usage monitors.

In some embodiments, each of the at least two water usage monitors is located in a different geographic location from the other.

In some embodiments, each of the plurality of water usage monitors includes a unique identifier configured to be scanned or otherwise communicated to the one or more network hubs. In some embodiments, the unique identifier indicates the location of the water usage monitor.

In some embodiments, wherein each of the at least two water usage monitors is configured to wirelessly communicate live flow data to the one or more network hubs.

In some embodiments, the plurality of water usage monitors are configured to communicate raw data reflective of voltage generated by the power generator to the network of distributed servers via the one or more network hubs. In some embodiments network of distributed servers is configured to calculate flow rate through the water usage monitors based on the raw data. In some embodiments, no calculations of flow rate are performed by the water usage monitors or by the one or more network hubs.

BRIEF DESCRIPTION OF THE DRAWINGS

The present disclosure is described with reference to the accompanying drawings, in which like reference characters reference like elements, and wherein.

DETAILED DESCRIPTION

Water mismanagement is one of the leading causes of poverty, economic crises, population displacement, illness, and malnourishment in the world. This is especially true in the developing world, where access to water is often limited, expensive, and/or inconsistent. In many cases, water collection and retention can consume inordinate man-hours and financial resources. Water access is often limited in the developed world as well, particularly in regions of low or inconsistent rainfall.

Water leakage can take a heavy toll on economies and infrastructure. For example, over 20% of potable water in the UK is lost to leaks before it reaches homes and business. The costs of making repairs to such leaks is often prohibitive, as locating the leaks can pose significant challenges. Such leakage can also exacerbate droughts and other water shortages. The consequences of such leakage and waste are made more dire as the frequency of droughts and rainfall shortages increases.

Given the importance of water to everyone's everyday lives, it is often desirable to optimize the performance (e.g., water usage, water distribution, water saving) of water systems. Such water systems can include irrigation systems, water utilities, municipal water distribution, and other water systems. One way to further optimize water systems is to utilize water usage meters that provide live and reliable flow data.

Figure 1:
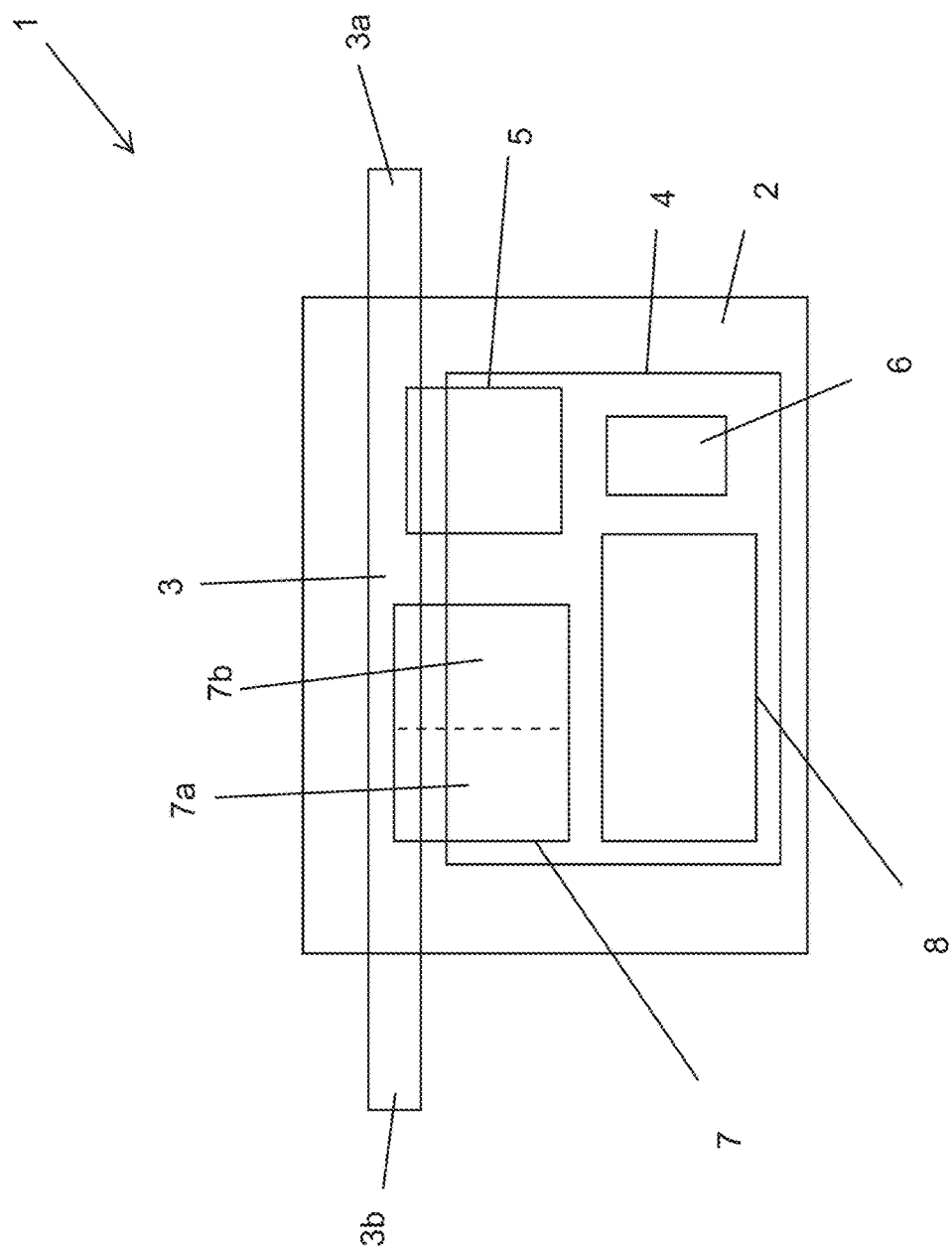
FIG. 1 is schematic illustration of an embodiment of a water usage monitor.
Figure 2:
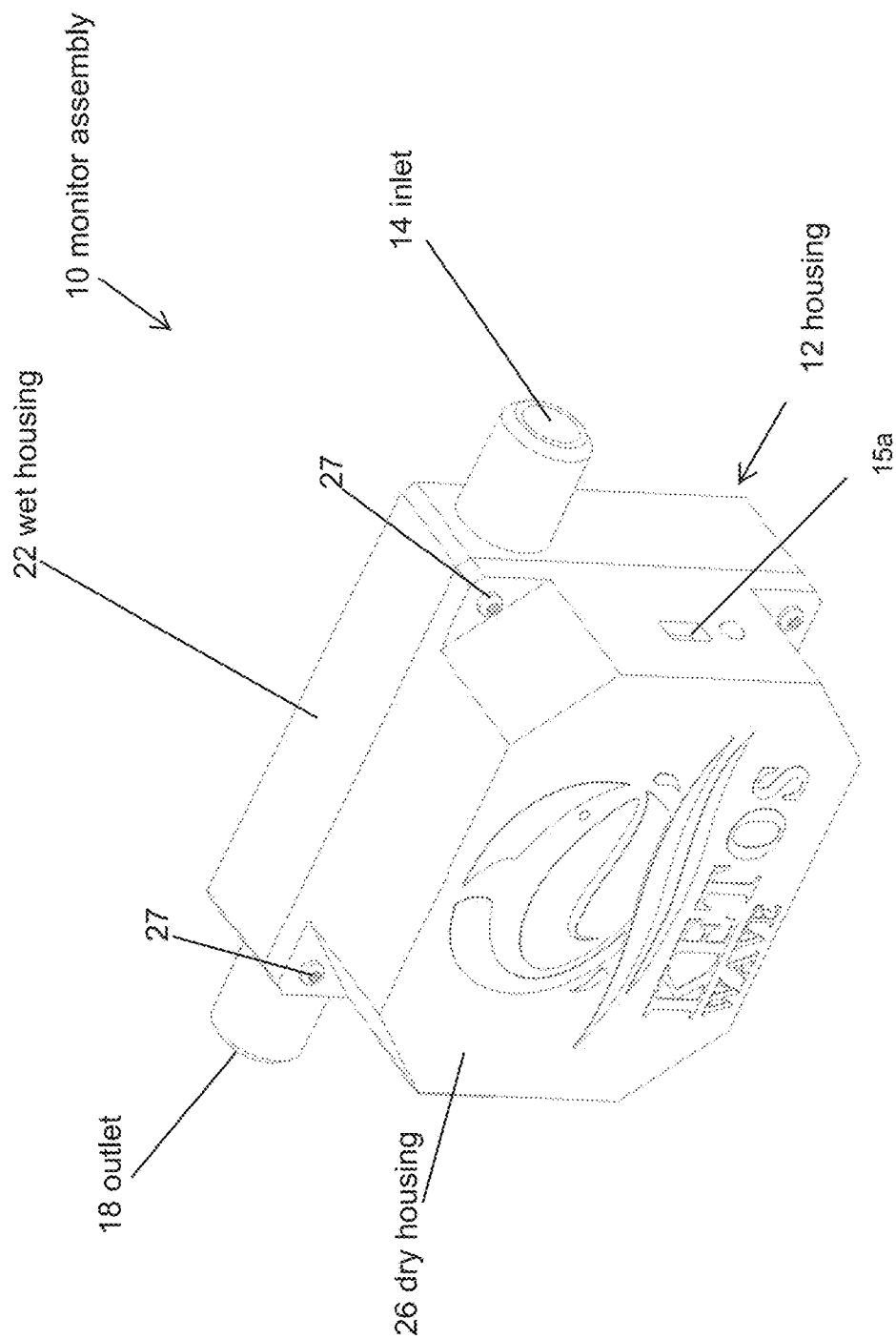
FIG. 2 is a front, right, top perspective view of an embodiment of a water usage monitor.
Figure 3:
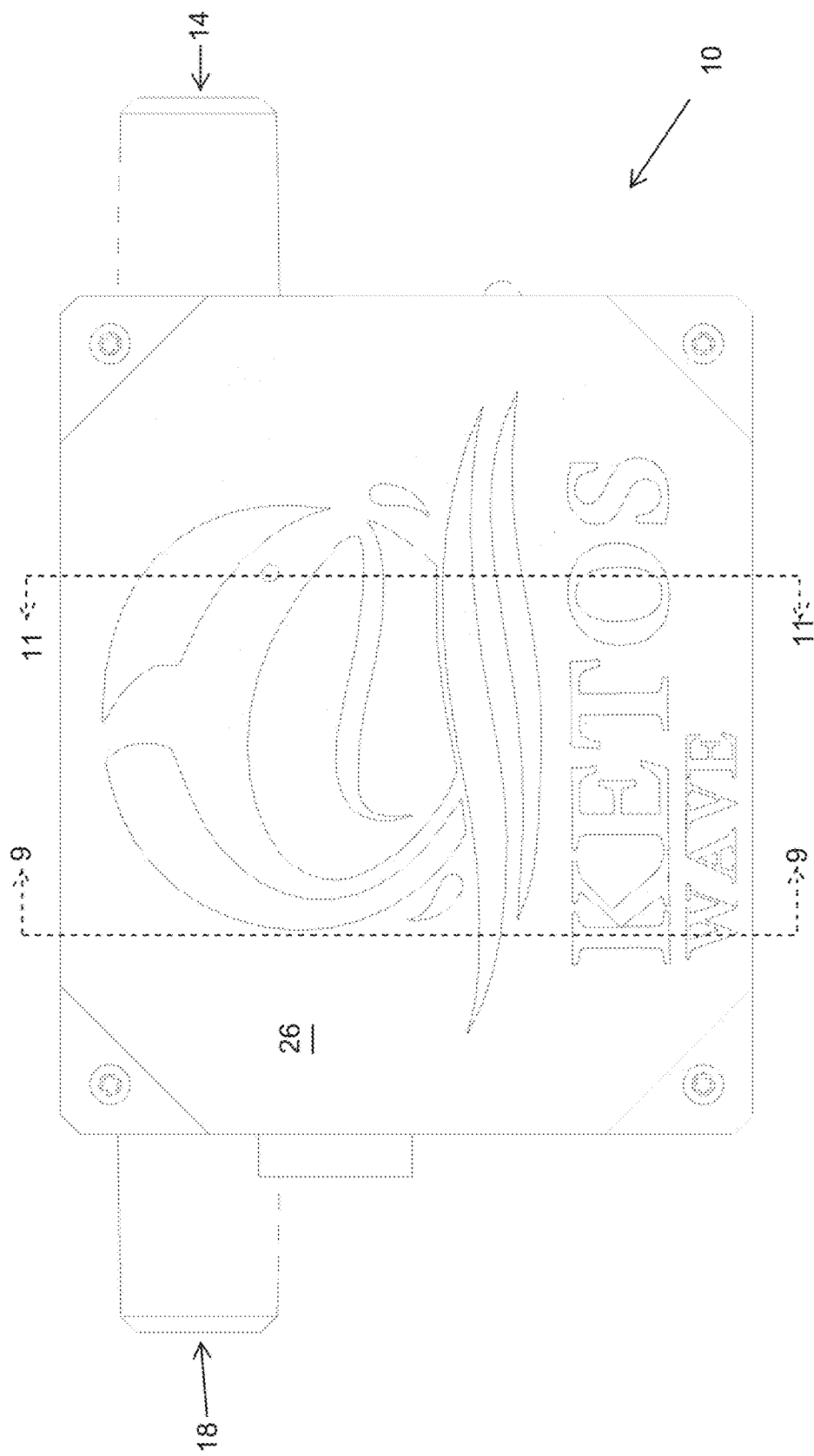
FIG. 3 is a front plan view of the water usage monitor of FIG. 2.
Figure 4:
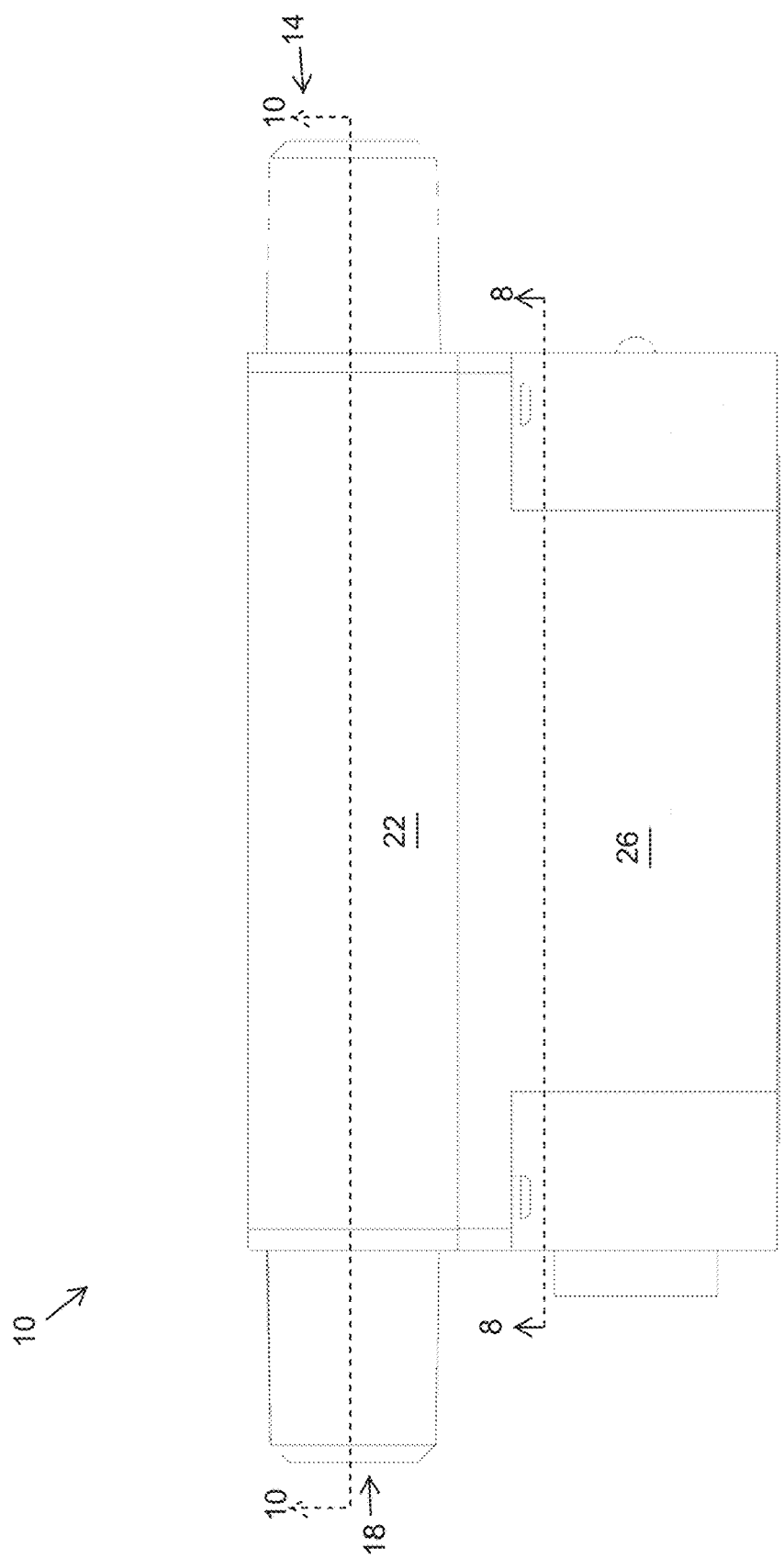
FIG. 4 is a top plan view of the water usage monitor of FIG. 2.
Figure 5:
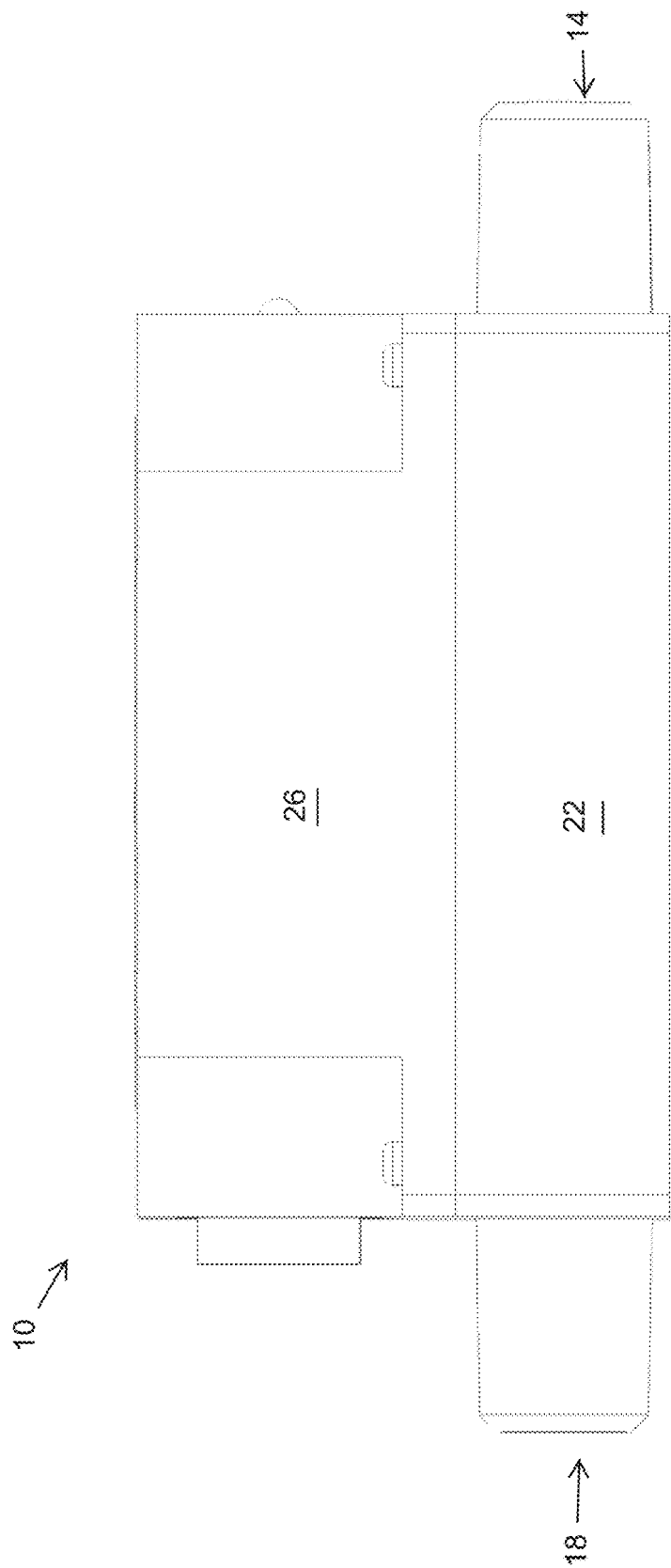
FIG. 5 is a bottom plan view of the water usage monitor of FIG. 2.

FIG. 1 schematically illustrates an embodiment of a water usage meter 1. The usage meter 1 can include a housing 2. As illustrated, the housing 2 can include a water flow path 3 extending therethrough. The water flow path 3 can include an inlet 3a and an outlet 3b. The cross-sectional width and shape of the water flow path 3 can vary or remain unchanged over all or a portion of the length of the flow path 3 between the inlet 3a and outlet 3b. For example, the water flow path 3 can include one or more areas of decreasing width (e.g., nozzle regions) or increasing width (diffuser regions) between the inlet 3a and outlet 3b.

In some embodiments, the housing 2 includes a dry compartment 4. The dry compartment 4 can be fluidly isolated from the water flow path 3. The dry compartment 4 can house one or more components of the water usage meter 1. Fluid isolation of the dry compartment 4 from the water flow path 3 can reduce the likelihood of damage to the components of the meter 1 from water or other fluids present in the flow path 3.

The water usage meter 1 can include a power generator 5. The power generator 5 can be positioned at least partially within the dry compartment 4 and at least partially within the water flow path 3. One or more seals (e.g., O-rings, sealing sleeves, grommets, etc.) can be connected to the power generator 5 and/or housing 2 to reduce the likelihood of water ingress into the dry compartment 4 from the water flow path 3. The power generator 5 can be configured to produce power via interaction with the water or other liquid flowing through the flow path 3. The power generated by the power generator 5 can be provided to the other components of the water usage meter 1, thereby reducing or eliminating the need for external power connections. In some embodiments, the water usage meter 1 includes a battery 6. The battery 6 can be configured to receive power from the power generator 5 can store that power for use by other components in the water usage meter 1. As illustrated, the battery 6 can be positioned at least partially within the housing 2. In some embodiments, the battery 6 is positioned at least partially outside of the housing 2 and/or within a second housing (not shown). The power generator 5 can be configured to provide power directly to the battery 6 and/or to other components of the water usage meter 1.

In some embodiments, the water usage meter 1 includes a water flow sensor configured to measure the rate of water flow through the water flow path 3. For example, the water usage meter 1 can include one or more of a turbine, Pitot tube, venture tube or other flow-measuring device. In some embodiments, the power generator 5 is configured operate as a water flow sensor. For example, the power generator 5 can be a turbine configured to rotate in response to fluid flow through the water flow path 3. The turbine can produce a voltage useful for providing power and/or for conversion to a velocity measurement, as described in more detail below.

One or more additional sensors 7 can be operably connected to the water usage meter 1. The sensors 7 can be wholly or partially within or without the dry compartment 4. In some embodiments, the water usage meter 1 includes a first sensor 7a and a second sensor 7b. The sensors 7 can be used to measure parameters (e.g., temperature, pressure, velocity, viscosity, purity, clarity, etc.) of the fluid within the water flow path 3, environmental factors (e.g., humidity, light, temperature, etc.) of the environment surrounding the water usage meter 1, and/or other parameters. In some embodiments, one or more of the sensors 7 is in fluid communication with the water flow path 3. One or more seals can be used in connection with such sensors to reduce the likelihood of water ingress into the dry compartment 4 or into the environment surrounding the housing 2 from water flow path 3.

The water flow sensor (e.g., the power generator 5) and/or other sensor 7 can be operably connected to a signal generator 8. The signal generator 8 can be positioned at least partially within the dry compartment 4. In some embodiments, the signal generator 8 is positioned at least partially outside of the dry compartment 4 and/or housing 2. The signal generator 8 can be configured to relay information from the sensors 5, 7 to an external device or network. The signal generator 8 can be powered by the battery 6 and/or directly by the power generator 5.

FIGS. 2-7 illustrate an embodiment of a water usage monitor 10. The water usage monitor 10 can include a housing 12. The housing 12 of the water usage monitor 10 can include one or more fluid inlets 14. As illustrated, the housing 12 can include one or more fluid outlets 18. In some embodiments, the fluid outlet(s) 18 are in-line with the fluid inlet(s) 14 and positioned on an end of the housing 12 opposite the fluid inlet(s) 14. In some embodiments, the fluid outlet(s) 18 are not in-line with the fluid inlet(s) 14 and are positioned on an end of the housing 12 opposite the fluid inlet(s) 14 or on a side of the housing 12 lateral to the fluid inlet(s) 14. In some embodiments, as illustrated, the housing 12 includes a single fluid inlet 14 in-line with a single fluid outlet 18.

The fluid inlet 14 can be configured to fluidly connect to a water source or some other fluid source. For example, the fluid inlet 14 can connect to a pipe, hose, spout, faucet, or other fluid source. In some embodiments, the fluid outlet 18 is configured to fluidly connect to a water line or fluid line. For example, the fluid outlet 18 can be configured to connect to a pipe, faucet, hose, or other fluid line. In some applications, the water usage monitor 10 is used as an end-of-line device to be attached to a water outlet such as a faucet or spout. In some such configurations, the fluid outlet 18 can be configured to output water or other fluids to an end user (e.g., directly into a sink or at the end of a hose). In some applications, the water usage monitor 10 is used in-line in a water system.

The housing 12 can include a first housing portion 22 (e.g., a wet housing) and a second housing portion 26 (e.g., a dry housing). The first and second housings 22, 26 can be configured to connect to each other via use of one or more fasteners 27, detent fittings, clips, threaded engagements, friction fittings, or other releasable attachment structures or methods. In some embodiments, the first and second housings 22, 26 are connected to each using adhesives, welding, or other permanent or semi-permanent attachment structures or methods. The first and second housing portions 22, 26 can be configured to connect to each other in a fluid-tight manner such that water and other fluids are not permitted to escape an interior of the housing 12 between the first and second portions 22, 26 of the housing 12.

Figure 6:
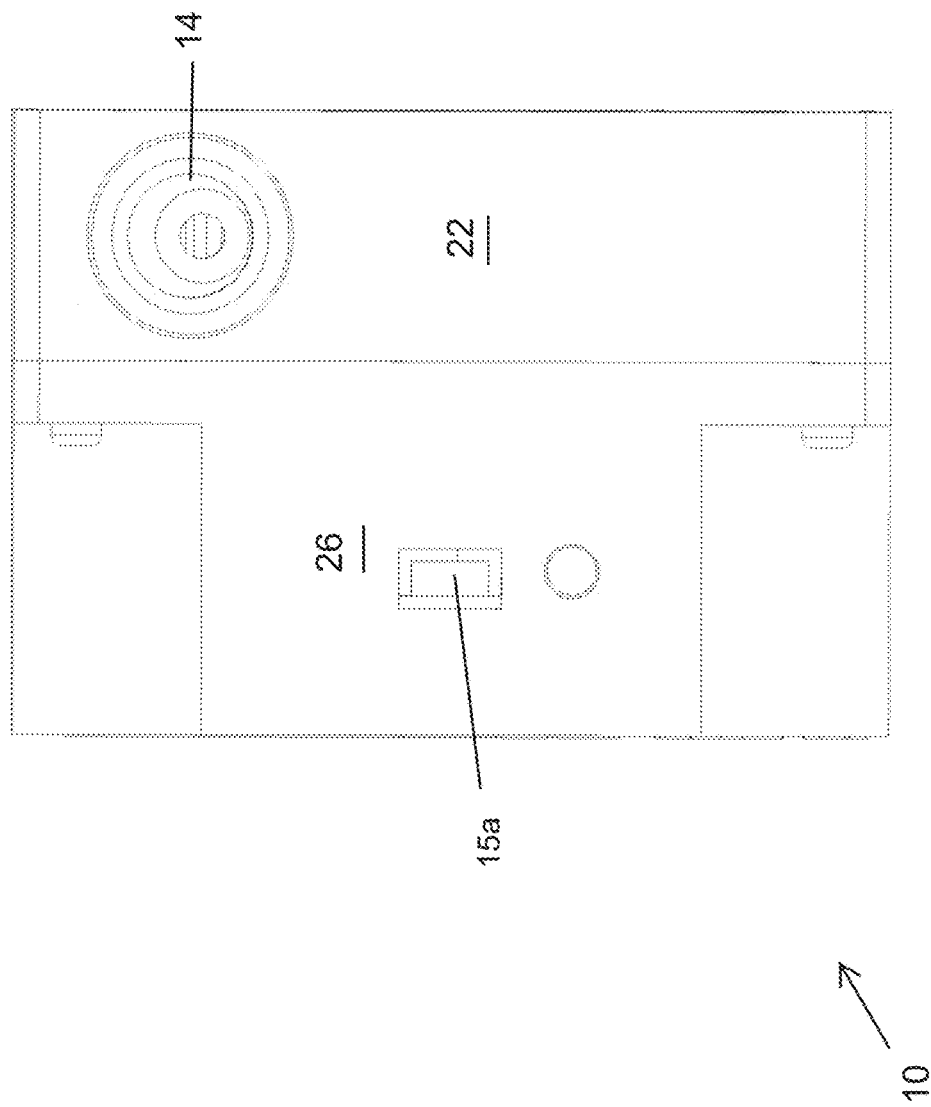
FIG. 6 is a right side plan view of the water usage monitor of FIG. 2.
Figure 7:
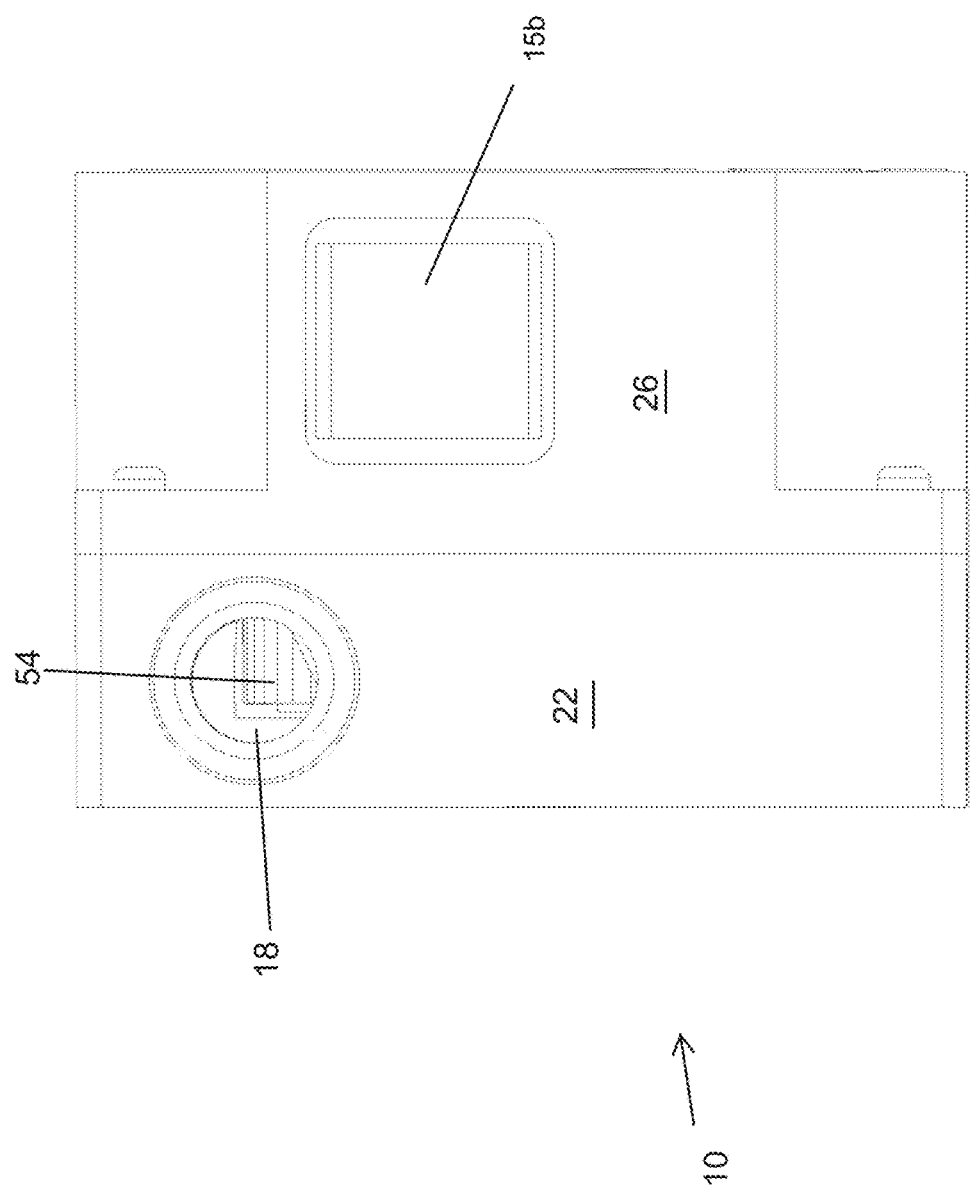
FIG. 7 is a left side plan view of the water usage monitor of FIG. 2.

As illustrated in FIGS. 6-7, the monitor 10 can include one or more sockets or plugs 15a, 15b. The sockets/plugs 15a, 15b can be configured to facilitate wired communication between two or more components. For example, multiple monitors 10 can be connected to each other using USB, RJ45, and/or other connections. In some applications, one or more monitors 10 are configured to connect to a network hub 100 via a wired connection. In some applications, all connections between the monitors 10 and network hub(s) 100 are wireless.

Figure 8:
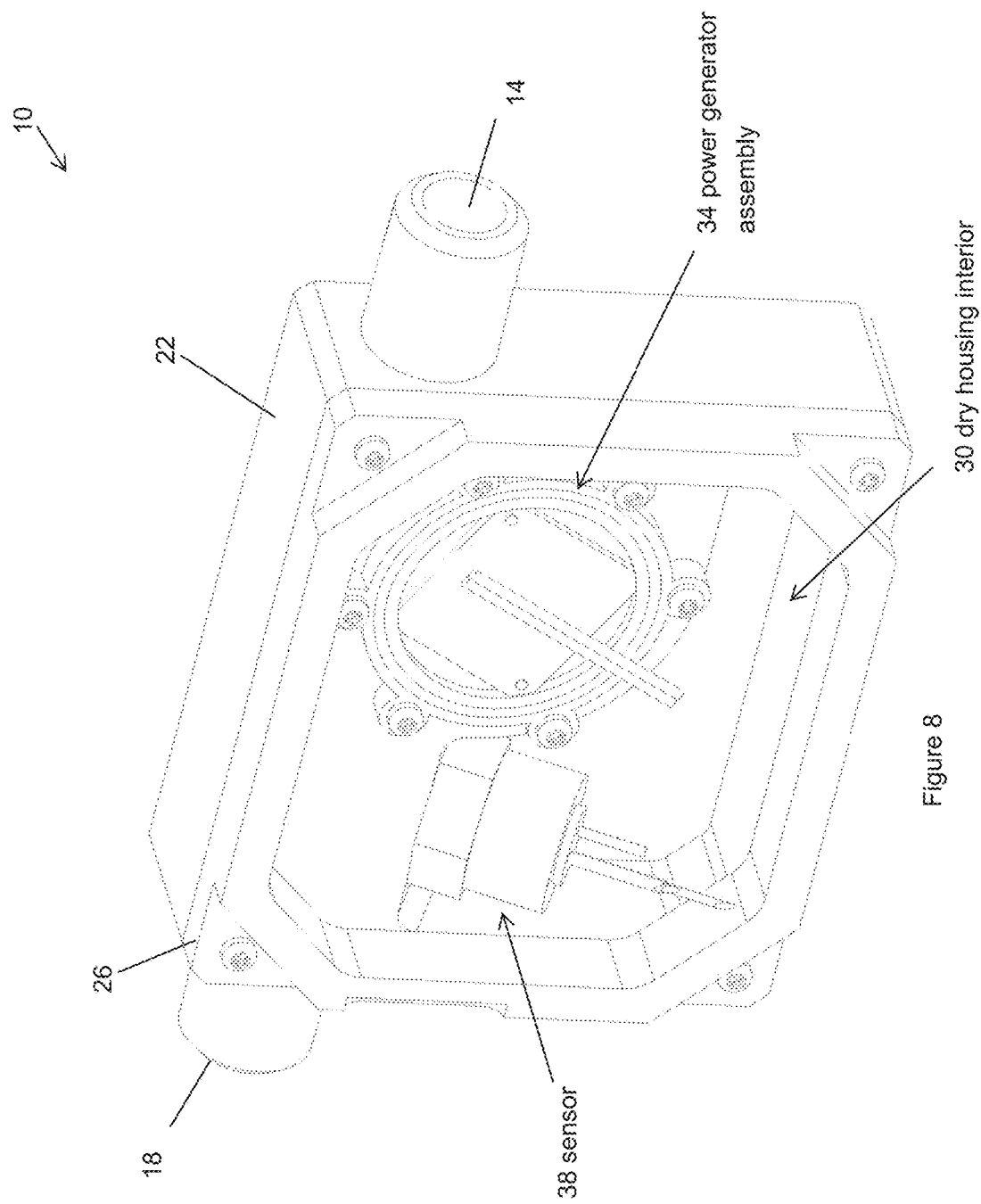
FIG. 8 is a perspective cross-sectional view of the water usage monitor of FIG. 2, taken along the cut-plane 8-8 of FIG. 4.

As illustrated in FIG. 8, the housing 12 can have an interior chamber 30. The interior chamber 30 can span one or both of the first and second housing portions 22, 26. One or more water usage meter components can be positioned at least partially within the interior chamber 30 of the housing 12. For example, a power generator assembly 34 can be positioned at least partially within the interior chamber 30. In some embodiments, the water usage meter 10 includes a sensor 38 (e.g., a pressure sensor, temperature sensor, optical sensor, ultrasonic sensor, or other sensor). The sensor 38 can be positioned at least partially within the interior chamber 30. In some embodiments, the sensor 38 is configured to operate at pressures of greater than or equal to 0.5 psi and/or less than or equal to 60 psi.

Figure 9:
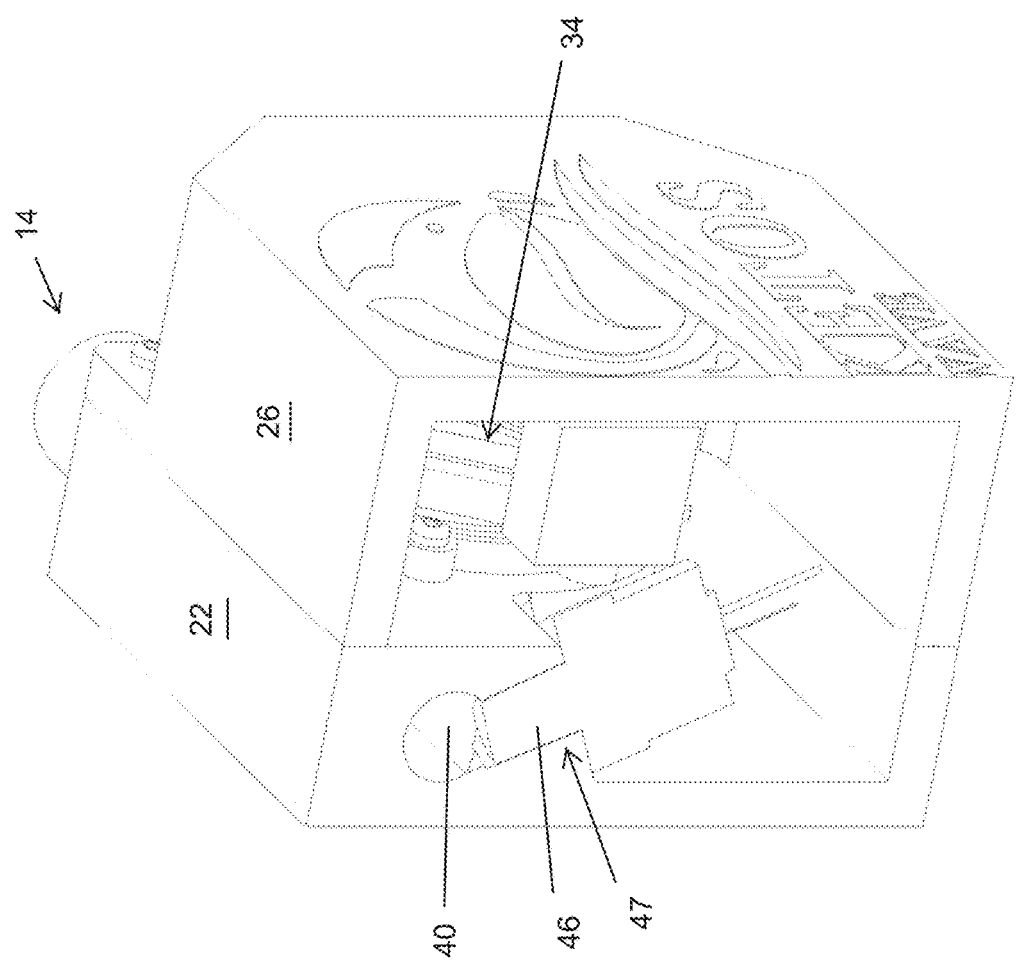
FIG. 9 is a perspective cross-sectional view of the water usage monitor of FIG. 2, taken along the cut-plane 9-9 of FIG. 3.

Moving to FIG. 9, the housing 12 can include a fluid flow passage 40 extending between the fluid inlet 14 and the fluid outlet 18. Preferably, the fluid flow passage 40 is fluidly isolated from the internal chamber 30 of the housing 12. The fluid flow passage 40 can have either a constant or variable cross-sectional area between the fluid inlet 14 and the fluid outlet 18. As illustrated, the fluid flow passage 40 can include a narrowed portion 42 (e.g., a control portion) having a reduced cross-sectional area with respect to the portions of the fluid flow passage 40 upstream and/or downstream of the narrowed portion 42. In some embodiments, the fluid flow passage 40 is substantially straight. Utilization of a straight or substantially straight fluid flow passage 40 can reduce undesired pressure buildup in the fluid flow passage 40. In some embodiments, using a straight or substantially straight fluid flow passage 40 can reduce turbulence in the fluid flow passage 40.

As illustrated, a sensing portion 46 of the sensor 38 can be in fluid communication with the fluid flow passage 40. For example, the first housing portion 22 can include one or more bores 47 (FIG. 9) extending between the internal chamber 30 of the housing 12 and the fluid flow path 40. The sensing portion 46 of the sensor 38 can extend through the bore. In some embodiments, the sensing portion 46 of the sensor 38 can be configured to measure pressure, temperature, or other fluid features. One or more seals (e.g., O-rings, sleeves, grommets, or other sealing structures) can inhibit or prevent fluid ingress from the fluid flow passage 40 into the internal chamber 30 by way of the bore 47. As illustrated, the bore 47 can be oriented at an angle oblique to vertical (e.g., up and down in the frame of reference of FIG. 9). In some embodiments, the bore 47 is oriented at an angle oblique to the axis of rotation of the turbine 50, as described below. Orienting the bore 47 at such angles can reduce the overall height (e.g., vertical dimension in FIG. 9) of the housing 12 required to fit the sensor 38 within the internal chamber 30 of the housing 12.

Figure 10:
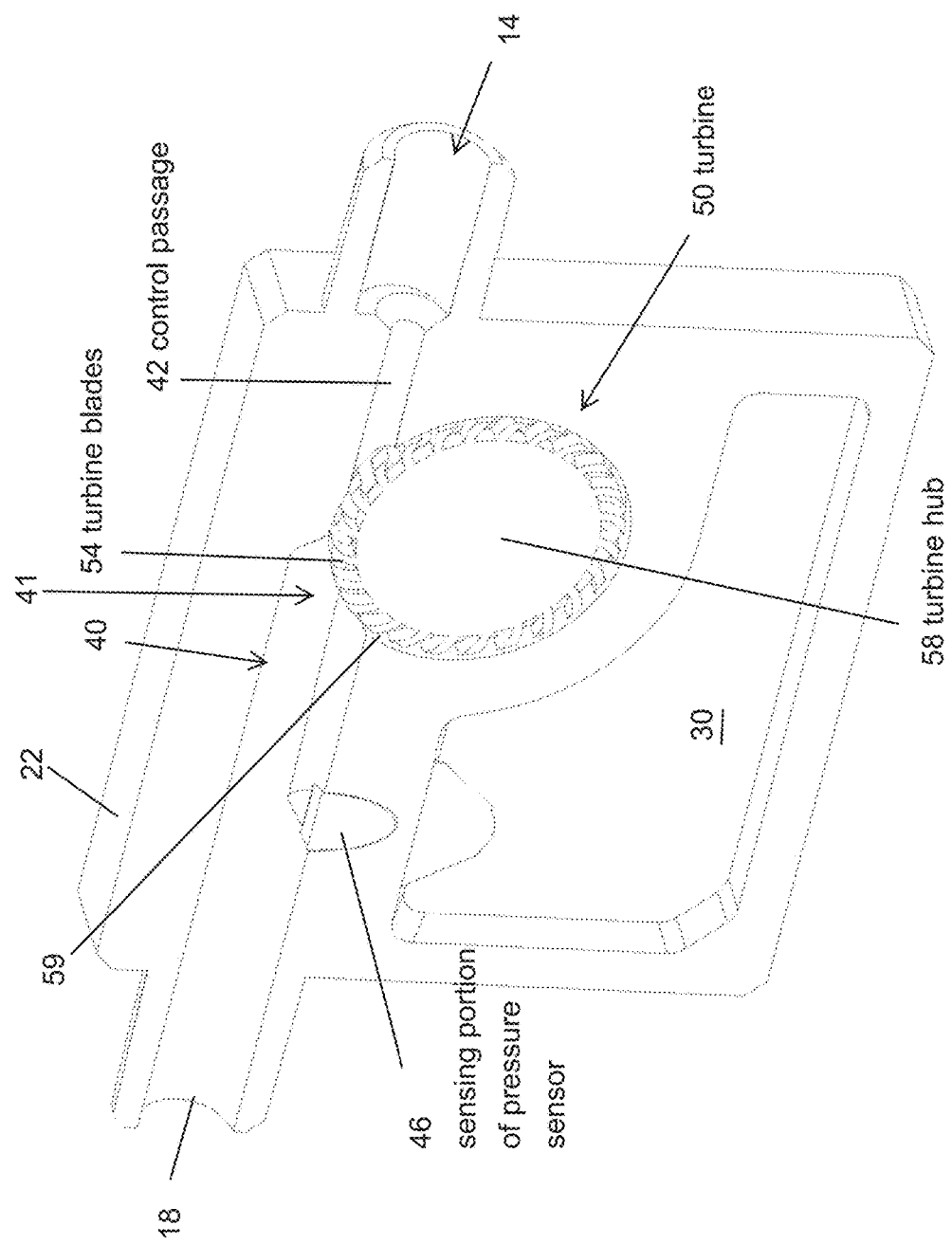
FIG. 10 is a perspective cross-sectional view of the water usage monitor of FIG. 2, taken along the cut-plane 10-10 of FIG. 4.
Figure 11:
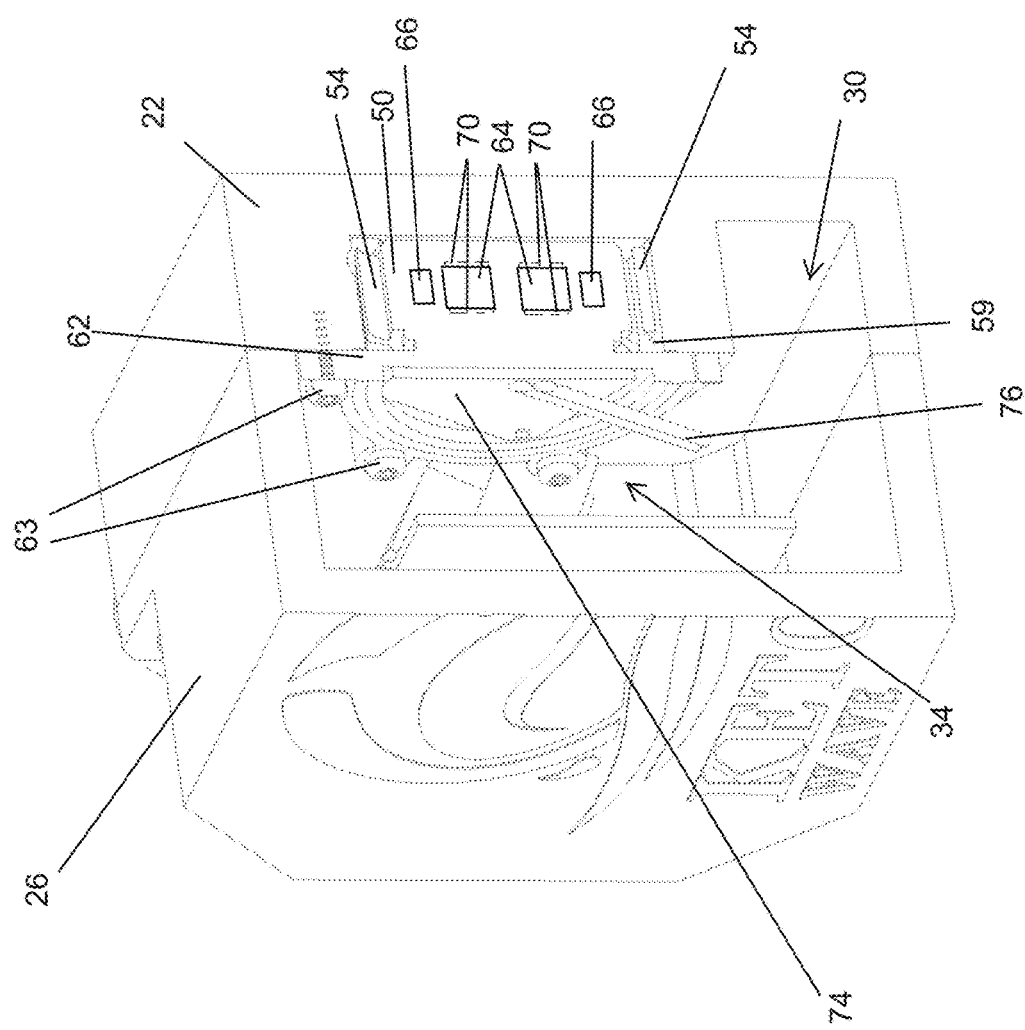
FIG. 11 is a perspective cross-sectional view of the water usage monitor of FIG. 2, taken along the cut-plane 11-11 of FIG. 3.

As illustrated in FIGS. 10 and 11, the power generator assembly 34 can include a turbine 50. The turbine 50 can include a plurality of turbine blades 54 extending radially outward from a turbine hub 58. The turbine 50 can be configured to operate as a Pelton turbine and to rotate in response to water flow or other fluid flow through the fluid flow path 40. At a given point of rotation of the turbine hub 58, at least one turbine blade 54 can be positioned in the fluid flow path 40. In some embodiments, between 10-30%, between 5-25%, between 15-45%, and/or between 20-35% of the turbine blades 54 are positioned in the fluid flow path 40 at a given point of rotation of the turbine hub 52. In some embodiments, approximately 25-28% of the turbine blades 54 are positioned in the fluid flow path 40 at a given point of rotation of the turbine hub 52.

In some embodiments, the first housing portion 22 and/or second housing portion 26 include a turbine cavity 59 in which the turbine 50 is at least partially positioned. The turbine cavity 59 can be in fluid communication with the fluid flow path 40. In some embodiments, the turbine cavity 59 has a diameter greater than a diameter of the turbine 50, including the turbine blades 54. The diameter of the turbine cavity 59 can be less than 5% greater than the diameter of the turbine 50. In some embodiments, the diameter of the turbine cavity 59 is less than 10%, less than 8%, less than 4%, less than 2%, and/or less than 1% greater than the diameter of the turbine 50. Sizing the turbine cavity 59 to be very close to the same diameter of the turbine 50 reduces dead space in the turbine cavity 59. In some embodiments, such relative sizing can reduce drag between the turbine blades 54 and fluid within the turbine cavity 59 as the turbine hub 58 rotates. The overall diameter of the turbine 50 can be between 0.25 and 1.5 inches, between 0.75 and 4 inches, between 1 and 3 inches, and/or between 2 and 10 inches. Many variations in the diameter of the turbine 50 both greater and smaller than these disclosed diameters may be used. In some configurations, utilizing a reduced cross-sectional area 42 of the flow path 40 in the vicinity of the turbine blades 54 can increase pressure and velocity of the fluid that impacts the turbine blades 54. This increased pressure and/or velocity can reduce the volumetric fluid flow rate required to rotate the turbine 50. In some embodiments, narrowing the fluid flow path 40 upstream and into the turbine 54 can facilitate reliable a predictable direction of flow onto the turbine blades 54. The increased performance of the turbine 50 can facilitate generations of high voltages for powering the components of the water usage monitor 10. For example, the turbine 50/power generator assembly 34 can be configured to generate at least 12 volts of electricity at flow rates as low as 4 liters per minute.

In some embodiments, it can be advantageous to expand the cross-sectional area of the fluid flow path 40 downstream of the control passage 42. Such an expansion 41 can facilitate use of a fluid outlet 18 having a cross-sectional area the same as or substantially the same as the cross-sectional area of the fluid inlet 14. Maintaining uniform inlet and outlet cross-sectional areas for the fluid flow path 40 can reduce the impact of the water monitor 10 on the overall flow rate of water into and out from the monitor 10. In some embodiments, the fluid inlet 14 and fluid outlet 18 do not have the same cross-sectional area. In some such cases, the water monitor 10 can be configured to perform with little or no impact on the overall flow rate of water or other fluids into and out from the monitor 10. Providing an expansion 41 of the cross-sectional area of the flow path 40 immediately downstream of the turbine 50 can reduce the likelihood of backpressure effects associated with such an expansion. For example, the turbine blades 54 can generate turbulence in the water downstream of the control passage 42 and break up pressure blockages which may otherwise propagate in the area of the expansion 41. In some embodiments, the turbine blades 54 can reduce or eliminate any back flow into the control passage 42. In some configurations, proximity of the turbine blades 54 to the expansion 41 can reduce the likelihood of settlement of debris or other sediment in the vicinity of the expansion 41, as the turbine blades 54 can stir up the sediment and increase the likelihood that the sediment is carried through the outlet 18 of the housing 12.

Figure 10A:
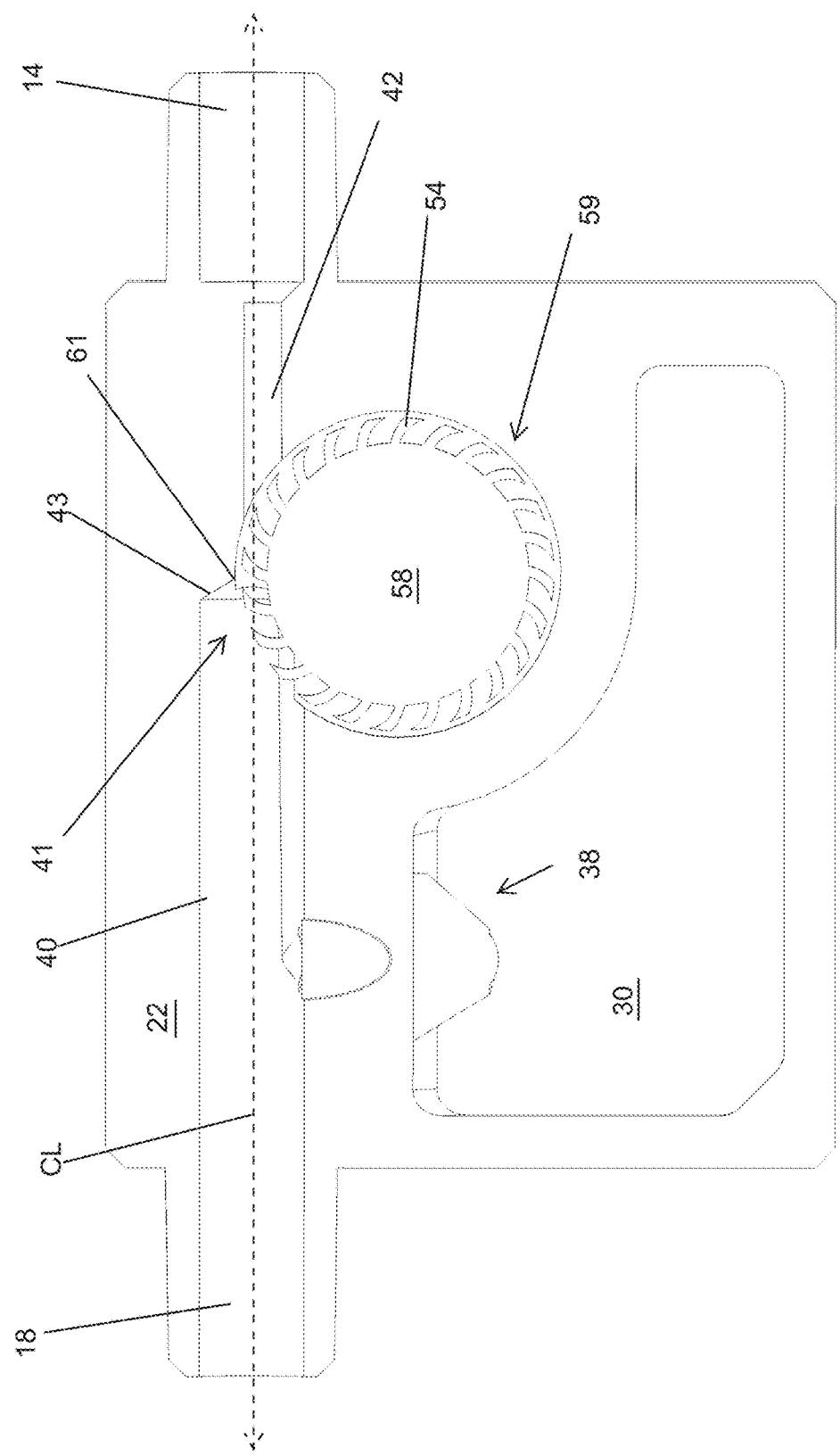
FIG. 10A is a front cross-sectional view of the water usage monitor of FIG. 2, taken along the cut-plane 10-10 of FIG. 4.

As illustrated in FIG. 10A, the expansion 41 of the can include an expansion wall 43 extending from the control passage 42. In some embodiments, the expansion wall 43 is frustoconical, hemispherical, flat, or some combination thereof. The expansion wall 43 can expand away the centerline CL of the fluid flow path 40 at an expansion angle. The expansion angle can be at least 10°, at least 20°, at least 30°, at least 45°, and/or at least 60°. In some embodiments, the expansion angle is approximately 63°.

As illustrated, the expansion wall 43 can emanate from the control passage 42 at an uppermost point on the turbine 50 with respect to the frame of reference of FIG. 10A. In some embodiments, a line drawn perpendicular to the centerline CL of the fluid flow path 40 and passing through the upstream end of the expansion wall bisects the turbine 50. In some such embodiments, the drawn line passes through the axis of rotation of the turbine 50. Positioning the beginning of the expansion 41 at the uppermost point of the turbine 50 can allow the blades 54 of the turbine 50 to impart downstream energy into the water in the expansion 41 to reduce the likelihood of pressure buildup in and/or back flow from the expansion 41 to the control passage 42.

As illustrated in FIG. 11, the power generator assembly 34 can include a fixed portion 62 connected to the turbine 50. The fixed portion 62 can be connected to the first housing 22 via one or more fasteners 63, adhesives, welding, and/or other connection structures or methods. In some embodiments, the fasteners 63 are arranged about the perimeter of the fixed portion 62. The fasteners 63 (e.g., and corresponding fastener holes) of the fixed portion 62 in a such that the fasteners 63 pass through an entire thickness of the first housing 22 without interfering with the fluid flow path 40, turbine 50, turbine blades 54, or other components of the monitor 10. The fixed portion 62 can have a width greater than the diameter of the turbine cavity 59. The turbine 50 (e.g., the turbine hub 58) can be configured to rotate with respect to the fixed portion 62 of the power generator assembly 34. One or more seals (e.g., O-rings) can be positioned between the fixed portion 62 and the portions of the housing 12 (e.g., the first housing portion 22) surrounding the turbine cavity 59. These seals can be configured to inhibit or prevent fluid ingress into the internal chamber 30 of the housing 12 from the turbine chamber 59 and/or from the fluid flow path 40. In some embodiments, these seals can be configured to flex or otherwise deform in the event of a pressure spike in the fluid flow path 40. The seals can be configured to rotationally flex (e.g., about the axis of rotation of the turbine 50) in response to pressure spikes in the fluid flow path 40. Flexing or deformation of the seals can reduce the risk of damage to the turbine in the event of a pressure spike.

The turbine 50 can include a plurality of fixed magnets 64. The fixed magnets 64 can be positioned in a circumferential array about an axis of rotation of the turbine 50. Conductive wiring 70 can be wrapped around the fixed magnets 64. The turbine 50 can include one or more rotating magnets 66. The one or more rotating magnets 66 can be positioned radially outward from the fixed magnets 64. The rotating magnet(s) 66 are preferably configured to rotate as the turbine 50 rotates in response to fluid flow through the fluid flow path 40. Rotation of the rotating magnet(s) 66 with respect to the fixed magnets 64 causes the rotating magnet(s) to pass through the magnet fields of the fixed magnets 64, thereby generating an electric current (e.g., an AC or DC current) through the conductive wiring 70 (e.g., wire coils). In some configurations, the turbine 50 can include several wire coils. For example, the turbine 50 can include at least 3, at least 5, at least 7, and/or at least 10 coils. In some embodiments, the turbine 50 includes 9 coils. This electric current is passed through the wiring 70 to a circuit board 74, which is configured to convert the electric current to usable power. For example, the circuit board 74 can include a rectifier circuit or other structure to convert AC current or DC current from the power generator 34 into DC current (or a modified DC current) for various components of the water usage meter 10. The circuit board 74 can be streamlined to include only those components necessary to convert power and receive signals from the components in the water usage monitor 10. For example, the circuit board 74 can be designed not to include components necessary for data storage. The usable power can be transmitted to other components of the water usage monitor 10. For example, one or more wires 76 can connected the power generator assembly 34 to a battery, to the sensor 38, and/or to other components of the water usage monitor 10. The frequency and/or amplitude of the current generated by the turbine 50 can be used to calculate flow rate of water or other liquids through the water usage monitor 10. For example, increased frequency of the voltage signal can correlate to increased velocity. Comparing the velocity measurement to the known physical dimensions of the flow path 40 can facilitate precise calculation of the absolute volumetric flow rate of water or other fluids through the monitor 10. In some embodiments, the monitor 10 (or the cloud 102 or the hub 100, described below) is configured to calculate pressure in the fluid flow passage 40 from the flow rate measurements obtained by the turbine 50.

Figure 11A:
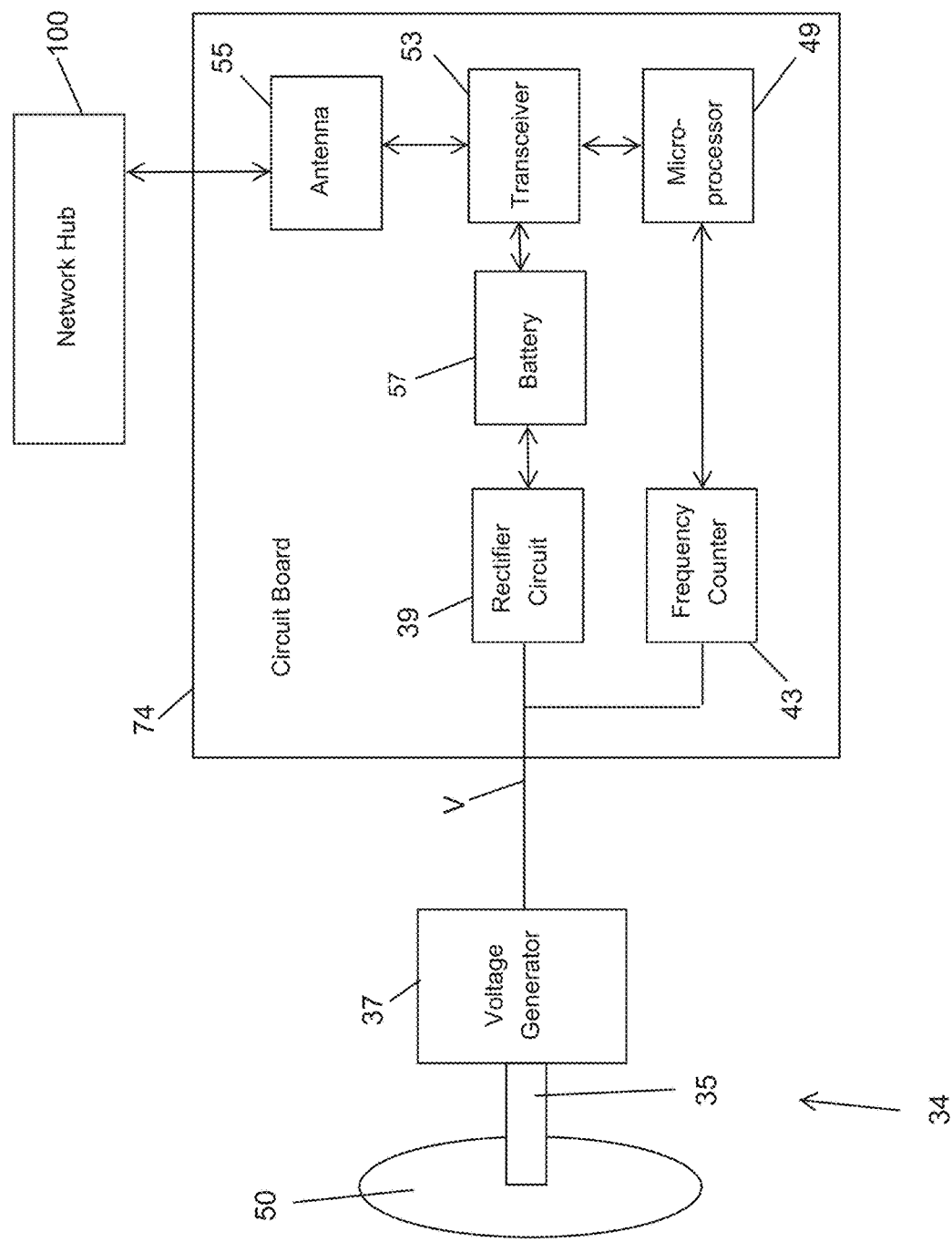
FIG. 11A is a schematic illustration of an embodiment of a power generator, electrical components, and network hub of a water usage monitor.

FIG. 11A schematically illustrates an example of the components used to calculate velocity of flow through the fluid flow path 40. As illustrated, the power generator 34 can include the turbine 50. The turbine 50 can be connected to a voltage generator 37. For example, the turbine 50 can be connected to the voltage generator 37 via a shaft 35. In some embodiments, the voltage generator 37 can be positioned at least partially within the turbine hub 58, as described above with respect to FIG. 11.

The voltage V generated by the voltage generator 37 can be directed to a rectifier circuit 39. In some cases, the voltage V output by the voltage generator 37 is a direct current. The direct current can be a pulsating or oscillating direct current. For example, the direct current generated by the voltage generator 37 can oscillate up to values of 20V, 30V, 40V or more. The rectifier circuit 39 can be configured to receive the direct current from the voltage generator 37 and convert it to a lower and/or non-pulsating current (e.g., 5V direct current, 3V direct current, or some other value). The rectifier circuit 39 can be positioned in the interior chamber 30 and/or on the circuit board 74. The rectifier circuit 39 can convert the voltage V to direct current and/or transmit usable power to a transceiver 53 and/or antenna 55 and other electrical components of the monitor 10. In some embodiments, the rectifier circuit 39 transmits usable power to one or more sensors 38 of the monitor 10.

In some embodiments, the rectifier circuit 39 directs usable power to a battery 57. The battery 57 can be used to power the one or more additional sensors 38, transceiver 53, microprocessor 49, and/or antenna 55. In some configurations, the battery 57 is used to power components of the monitor 10 when the turbine 50 is not generating power. The voltage V of the voltage generator 37 can be transmitted to a frequency counter 43 either in series with or in parallel with the rectifier circuit 39. The frequency counter 43 can be configured to output a signal indicating the frequency and/or amplitude of the voltage V generated by the voltage generator 37. As such, the same voltage V can be used to both power the electrical components of the monitor 10 and provide the raw data for calculating fluid flow rate through the fluid flow path 40. Calculating fluid flow rate directly from the frequency and/or amplitude of the generated voltage V can reduce the need for additional sensors. The frequency counter 43, transceiver 53, and antenna 55 can positioned on the circuit board 74 and/or at least partially within the interior chamber 30. One or more of the components of the circuit board 74 and/or within the interior chamber 30 can be operably connected to a microprocessor 49. In some embodiments, the microprocessor 49 is configured to perform the function of the frequency counter 43. The microprocessor 49 can be positioned on the circuit board 74 and/or within the interior chamber 30. The transceiver 53 and/or antenna 55 can be configured to communicate with a network hub 100 or network of distributed servers 102. In some applications, more than one monitor 10 is configured to communicate with a single hub 100. In some applications, each hub 100 is configured to communicate with a single monitor 10.

Figure 11B:
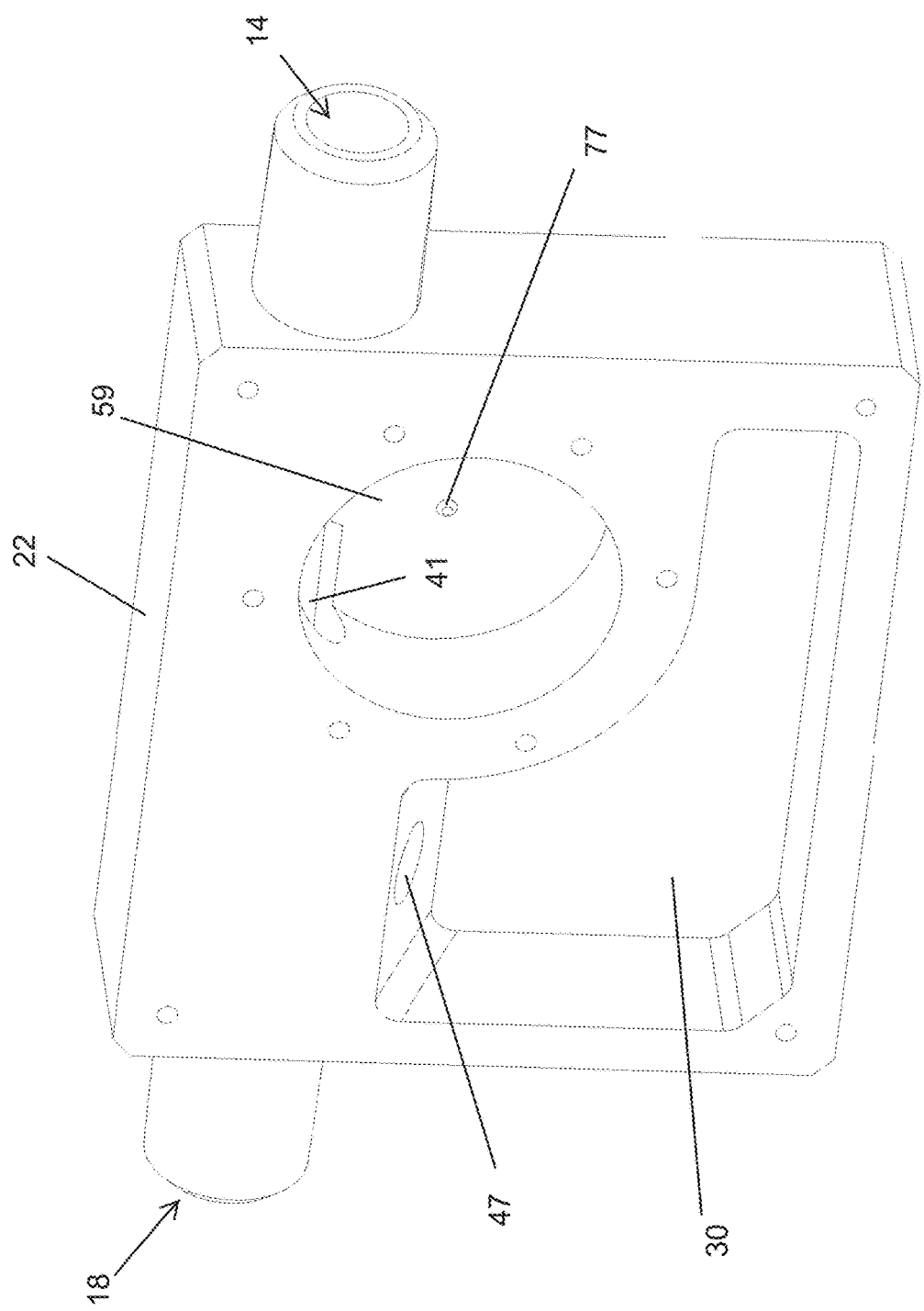
FIG. 11B is a perspective view of a first housing of the water usage monitor of FIG. 2.

Referencing FIG. 11B, the water usage monitor 10 can include an alignment feature configured to stabilize and/or align the turbine 50. For example, the turbine cavity 59 can include a protrusion or recess 77 configured to engage with a recess or protrusion on the turbine 50 (e.g., on the turbine hub 58). The alignment feature can reduce wobble, tilting, or other rotational instability of the turbine 50 as it rotates.

Figure 12:
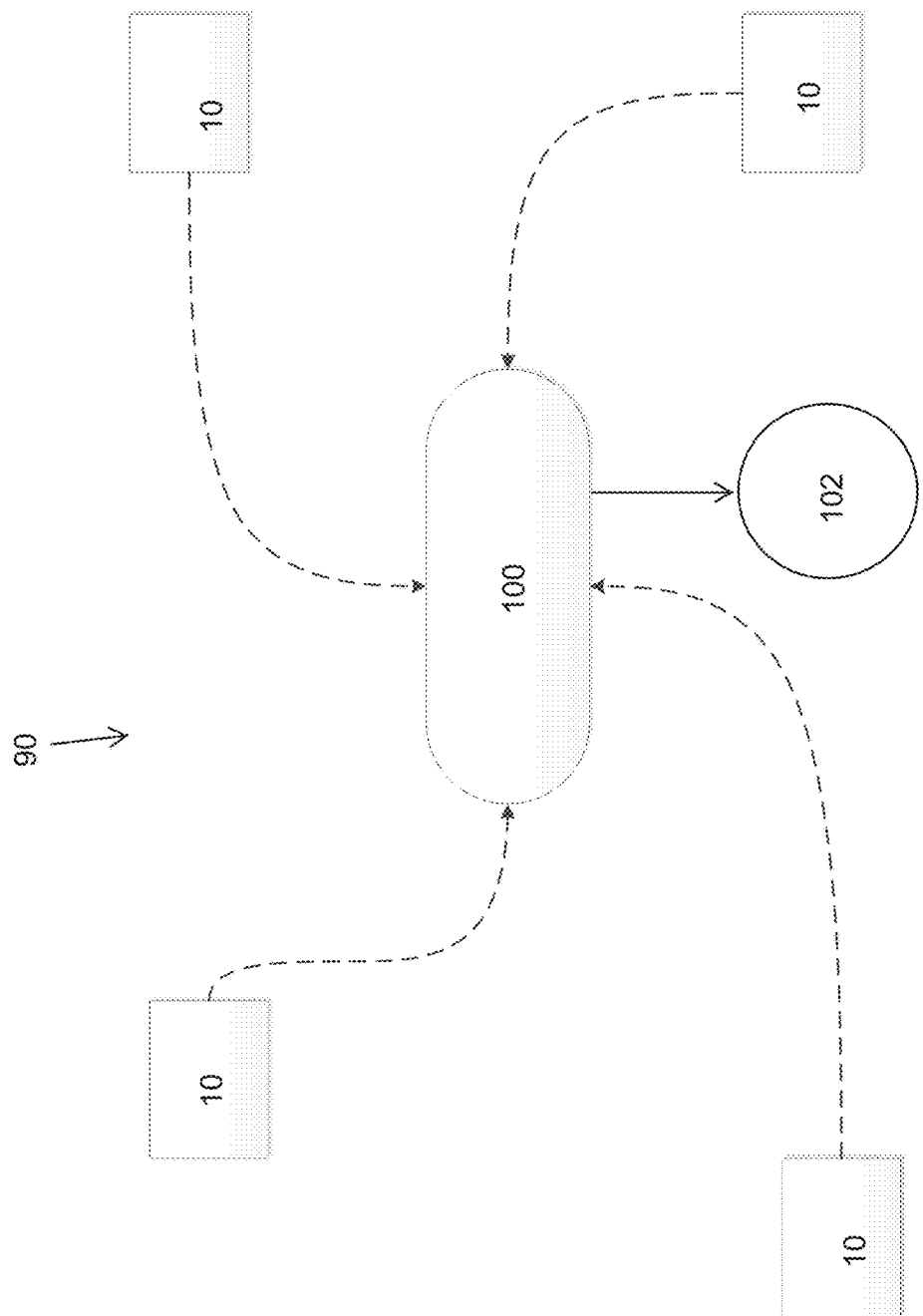
FIG. 12 is a schematic illustration of a water usage monitoring system.

As illustrated in FIG. 12, a plurality of water usage monitors 10 can be connected to a cloud network 102 or other network of distributed servers to form a monitoring network 90. For example, each of the water usage monitors 10 can include a signal generator configured to generate and send signals (e.g., wireless signals) to the cloud 102. This can be accomplished via a Wi-Fi, Bluetooth®, RF transmission, LoRaWAN, Radio/cellular, GSM, or other wireless signal. In some embodiments, two or more of the monitors 10 can communicate with each other, either wirelessly or via a wired connection. The monitors 10 and/or network hub(s) 100 can form a mesh network in which communications are sent between the monitors 10 and network hub(s) 100.

Preferably, the one or more network hubs 100 communicate the signals from the water usage monitors 10 to the cloud network 102. In some embodiments, all data processing is performed on the cloud network 102 (e.g., the network of distributed servers), without processing on the hub(s) 100 or at the individual monitors 10. This arrangement can be advantageous for a number of reasons. For example, the design and structure of the monitors 10 can be simplified due to the lack of a need for data processing. This simplification can reduce the size and/or power consumption of the monitors 10. In some cases, retaining all data processing on the cloud network 102 can reduce the risk of security compromise if a thief or other bad actor were to obtain an individual monitor 10 or network hub 100.

The communication between the network hub(s) 100, cloud 102, and individual water usage monitors 10 can be bi-directional. For example, as explained above, the individual water usage monitors 10 can relay information to the network hub(s) 100 which can, in turn, relay information to the cloud network 102. The system can be configured such that the cloud 102 and/or hub 100 can relay information back to the water usage monitors 10 to tune, calibrate, or otherwise affect a change in operation of the water usage monitors 10. Remotely controlling the software on the monitor 10 can facilitate generations of new and/or different data for analyzing large and small scale water usage characteristics of a given application. Utilizing such functionality with or without mesh network functionality can create a scalable network architecture.

Figure 13:
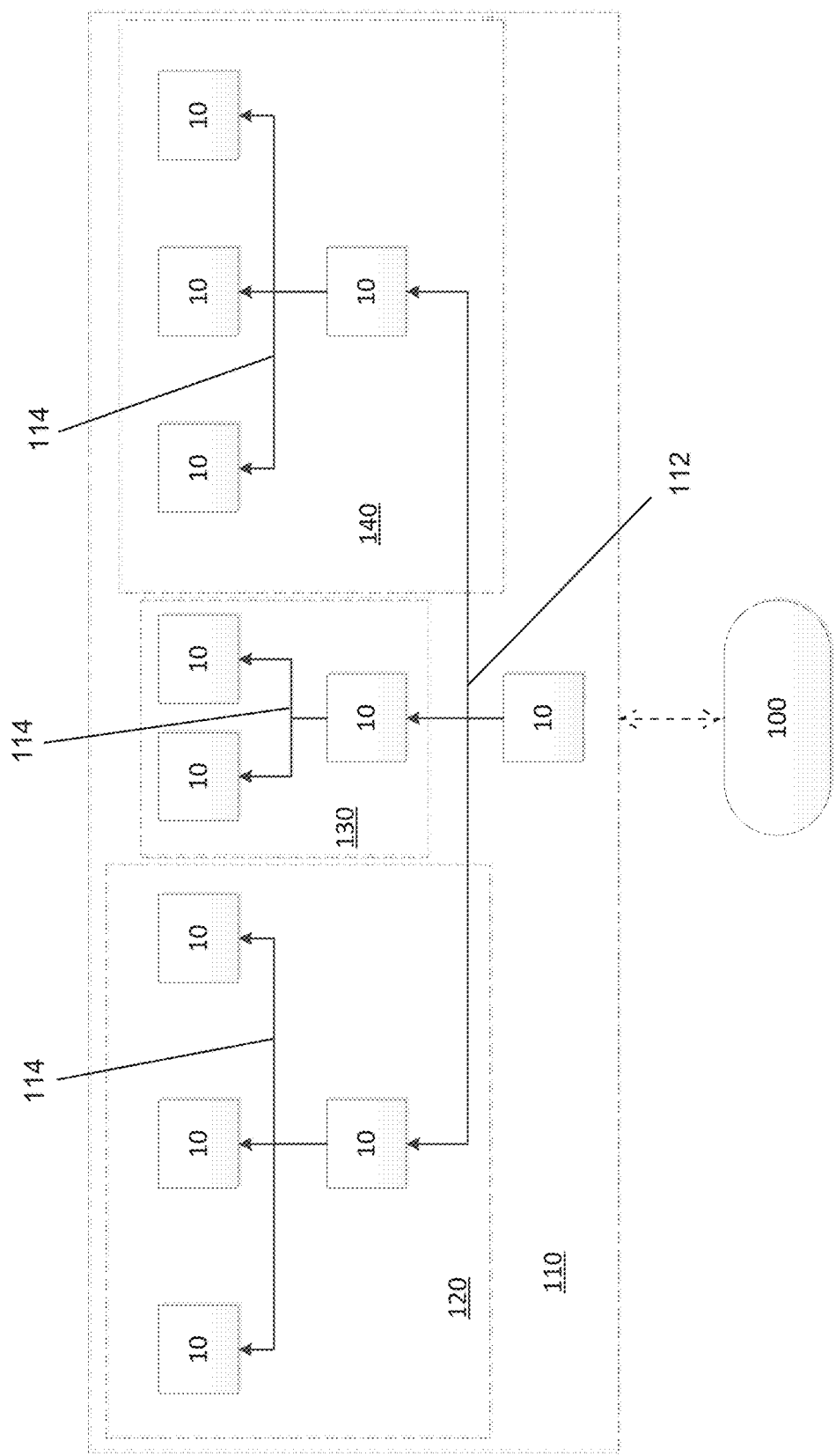
FIG. 13 is a schematic illustration of a water usage monitoring system as installed in a water flow network.

As illustrated in FIG. 13, the water usage monitors 10 can be used in a water network 110 comprising a plurality of pipes 112, 114. For example, the water usage monitors 10 can be positioned in a plurality of generations of piping. As illustrated, at least one water usage monitor 10 can be positioned in line with both first generation pipes 112 (e.g., pipes connected to a water hub or water source) and second generations pipes 114 (e.g., pipes downstream of the water usage monitors 10 connected to the first generations pipes 112). The water usage monitors 10 can be provided with unique identifiers (e.g., QR codes, bar codes, RF tags, alphanumerical codes, etc.) that can be entered/scanned by an installer to identify the particular water usage monitor 10 with a particular position in the water network 110.

The water usage monitors 10, utilizing the self-charging functionality of the power generator assemblies 34, can provide water flow information (e.g., flow rate, temperature, pressure, clarity, purity, etc.) in an on-demand and/or continual basis. The ability to monitor flow characteristics in specified regions of the water network 110 can enable precise and accurate identification of leaks, blockages, clogged/expired filters, mechanical failure, and/or other problems in the water network. For example, the overall arrangement of the water monitors 10 with respect to the pipes 112, 114 is known by the service provider who, in turn, can group the water monitors 10 in any number of groupings 120, 130, 140. If an abnormal flow rate were detected in a first group 120 of monitors, but flow rate appeared as expected in a second group of monitors 130, the technician or other service provider could quickly identify the portion of pipe or the particular monitor 10 having the problem or deficiency. In other words, the unique identification of the water monitors 10 with respect to their location in the water network 110 can facilitate expedient and accurate identification of defective pipes and monitors based upon the information contemporaneously gathered by the monitors 10 through the system 110 and groupings 120, 130, 140. Exemplary water networks 110 could include public utilities, agricultural arrays, golf courses, or other water networks.

Other applications of the disclosed live-monitoring network include analysis of water usage and other characteristics over a geographic region. The information collected from the individual monitors 10 distributed throughout a region could be compared and analyzed to determine such information such as climate change, degree of drought, flooding, and other information. For example, higher water usage in a specific grouping or distribution of monitors 10 can indicate a more severe drought, higher temperatures, and/or other environmental and usage characteristics. This data and analysis can be correlated to data received from other groupings of monitors in other locations, as well as to known environmental data such as temperature, humidity, sunlight, rainfall, and other data.

The live, geographically-correlated data from the monitors 10 could be used by utilities and other entities to identify excessive use of water by one user compared to other users. For example, the network of monitors 10 could identify that a specific user in a given region or industry uses considerably more water than other users in that same region or industry. The utility or other entity could modify its billing and/or distribution structure to discourage wasteful use of water with respect to the abusing user.

The information and data gathered from each monitor 10 can be stored in the cloud network 102 or elsewhere. The stored information can be correlated to a given monitor 10, given location, given user, given appliance (e.g., sprinkler, water fountain, etc.), and/or to some other unique identifier. The storage of such correlated data can facilitate faster and more accurate analysis of the live data provided by the monitors 10. For example, live monitor data indicative of leaks or blockages can be correlated to historic monitor data and/or data from monitors 10 in other locations to further confirm the accuracy of the live monitor data.

In some applications, the information and data gathered form the monitors 10 can facilitate optimization of a given application. For example, data gathered from monitors 10 in an irrigation system can indicate misdistribution of water in one or more zones of the irrigation system. Such misdistribution could, for example, indicate improper accounting for elevation changes, improper valve settings or pipe diameters, or improper sprinkler usage. Similar analysis could be performed on golf courses, municipalities, and other systems.

Figure 14:
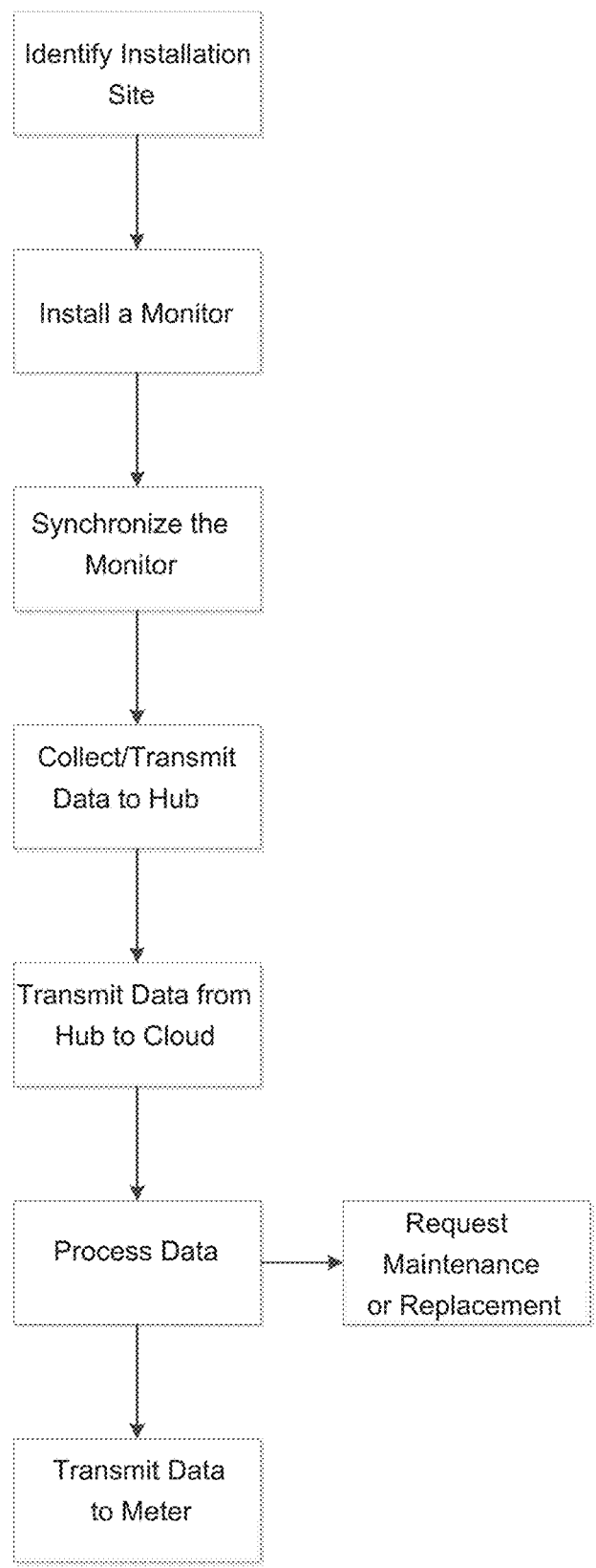
FIG. 14 is a flow chart of an embodiment of an operating process of a fluid usage monitoring system.

As illustrated in FIG. 14, a process of using the water usage monitors 10 can begin with the step of selecting the installation sites for the monitors. These sites can include water pipes or other water flow passages. For example, monitors 10 could be installed in commercial, residential, agricultural, utility, and/or other water systems. The process of use can continue with the step of installing the meters 10. The meters 10 can be installed in-line with a water flow passage, at the downstream end of a water flow passage, at a juncture of a plurality of flow passages, and/or at the upstream end of a water flow passage. Before or after installing a given meter, the step of syncing that meter with the network 90 can be performed. Syncing the meters 10 can include scanning a visual code (e.g., a barcode, QR code, alphanumeric code, color coding), an RF identifier, or some other unique identifier. In some applications, syncing the meters 10 includes manually entering an alphanumeric code. Once installed and synced, the monitors 10 can perform the step of collecting and transmitting raw data (e.g., voltages, temperatures, pressures, etc.) to the network hub(s) 100. The step of transmitting data from the network hub(s) 100 to the cloud 102 can be performed after or concurrently with the step of transmitting data from the monitors 10 to the network hub(s) 100. The system 90 can take the step of processing the raw data to calculate flow parameters such as flow velocity, pressure, and other flow features. In some applications, additional calculations can be performed to determine leaks, clogs, mechanical failures, and other problems or issues in the network 90 (e.g., in a flow meter 10 and/or in the water flow passages between flow meters 10). Based on the performed calculations, the system 90 or a system operator can request targeted maintenance or other service on the network 90. In some cases, the step of transmitting data or operational commands to the meters 10 from the cloud 102 is performed. In some applications, one or more of the steps of the process are performed in an order other than the order illustrated in FIG. 14.

Figure 15:
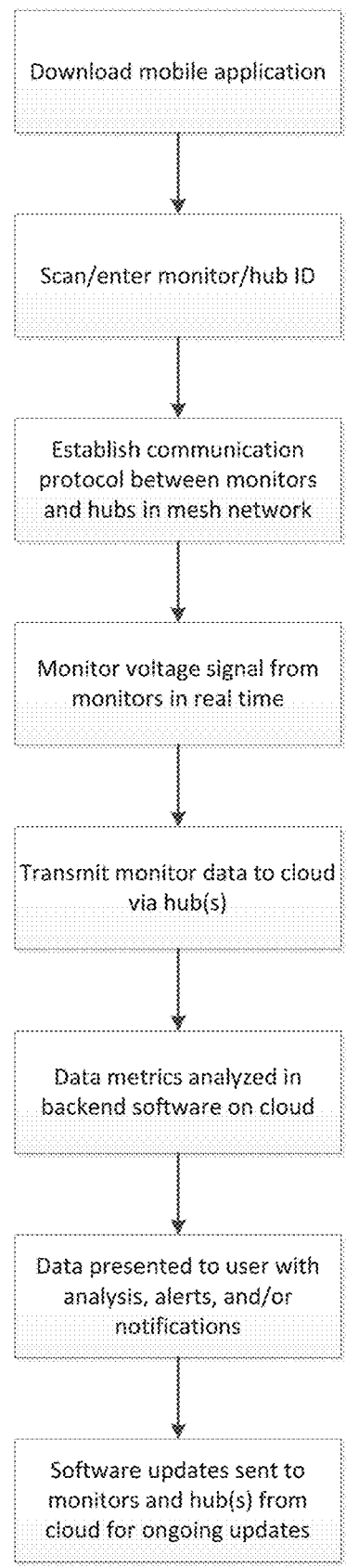
FIG. 15 is another flow chart of another embodiment of an operating process of a fluid usage monitoring system.

FIG. 15 illustrates a process of using the network 90. To begin, a user or installer of the monitors can download a mobile application configured to facilitate installation of the monitors 10 and/or hub(s) 100. In some cases, the installer can use a hardware device pre-programmed with installation software. The installer can then install the monitors 10 and hubs 100 in the desired locations for monitoring. Prior to or after installation of the monitors 10 and hubs 100, the installer can scan or otherwise enter unique identification information from the monitors 10 and hubs 100. Such unique identification information can include a barcode, QR code, alphanumeric code, color coding, an RF ID, or some other unique identifier. The monitors 10 and hubs 100 can be configured automatically establish communication protocols between each other and the network of distributed servers 102. In some applications, the installer or user establishes such protocols. The communication protocols can establish a mesh network of monitors 10 and/or hub(s) 100.

The network 90 can be configured to monitor the voltage signals from the monitors 10 in real time and to transmit the monitor data to the cloud 102 via the one or more hub(s) 100. The monitor data (e.g., voltage from the turbines, pressure sensor data, temperature sensor data, and/or other sensor data) can be analyzed on the cloud 102. The data and/or analysis can be presented to the user. Such presentation can include alerts, warnings, requests for maintenance, and/or other reports. The cloud 102 can push software updates and/or other communications back to the monitors 10 and hubs 100 to facilitate efficient and reliable operation of the network 90.

For expository purposes, the term "horizontal" as used herein is defined as a plane parallel to the plane or surface of the floor of the area in which the system being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane. In some cases, the term "above" can refer to a position upstream and the term "below" can refer to a position downstream. Upstream and downstream can refer to the direction of flow through the water usage monitors disclosed herein.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

The terms "approximately", "about", "generally" and "substantially" as used herein represent an amount close to the stated amount that still performs a desired function or achieves a desired result. For example, the terms "approximately", "about", "generally," and "substantially" may refer to an amount that is within less than 10% of the stated amount.

While the preferred embodiments of the present disclosure have been described above, it should be understood that they have been presented by way of example only, and not of limitation. It will be apparent to persons skilled in the relevant art that various changes in form and detail can be made therein without departing from the spirit and scope of the disclosure. For example, while some specific embodiments of monitors are described as measuring characteristics of water, usage of the monitors is not limited to water only. Other applications of the monitors include collection of data from other liquids, gases, sludges, and/or mixtures thereof. Thus the present disclosure should not be limited by the above-described exemplary embodiments, but should be defined only in accordance with the following claims and their equivalents. Furthermore, while certain advantages of the disclosure have been described herein, it is to be understood that not necessarily all such advantages may be achieved in accordance with any particular embodiment of the disclosure. Thus, for example, those skilled in the art will recognize that the disclosure may be embodied or carried out in a manner that achieves or optimizes one advantage or group of advantages as taught herein without necessarily achieving other advantages as may be taught or suggested herein.

What is claimed is:

1. A water usage monitor comprising:
    a housing having:
        a fluid flow path;
        a fluid inlet in fluid communication with the fluid flow path and configured to facilitate fluid communication between a fluid source and the fluid flow path;
        a fluid outlet in fluid communication with the fluid flow path at an end of the fluid flow path opposite the fluid inlet, the fluid outlet facilitating outflow of fluid from the fluid flow path to an exterior of the housing; and
        a dry housing interior fluidly isolated from the fluid flow path;
    a power generator positioned at least partially in the fluid flow path, the power generator configured to generate a voltage when fluid flows through the fluid flow path from the fluid inlet;
    at least one sensor positioned at least partially within the dry housing and configured to measure at least one characteristic of a fluid flowing through the fluid flow path; and
    a signal generator operably connected to the power generator and to the at least one sensor, the signal generator configured transmit signals from the power generator and from the at least one sensor to a remote processor;
    wherein the power generator is configured to power both the at least one sensor and the signal generator in response to fluid flow through the fluid flow path, wherein the power generator is configured to output signals usable for calculating flow rate of fluid through the flow path, wherein the power generator is configured to generate a voltage indicative of fluid flow rate through the fluid flow path, wherein the power generator is a turbine, wherein the turbine includes a plurality of turbine blades and wherein, at any instant in time, only a subset of the plurality of turbine blades are positioned in the fluid flow passage, and wherein the fluid flow path includes an expansion region having an upstream end and a downstream end having a larger cross-sectional area than the upstream end of the expansion region, and wherein one or more of the subset of the plurality of blades are positioned in the expansion region.

2. The water usage monitor of claim 1, wherein the power generator is a turbine, wherein the turbine is configured to rotate about an axis of rotation in response to fluid flow through the fluid flow path, wherein the axis of rotation of the turbine is perpendicular to the fluid flow path.

3. The water usage monitor of claim 1, wherein the upstream end of the expansion region is positioned such that a line perpendicular to a centerline of the fluid flow path can pass through both the upstream end of the expansion region and the axis of rotation of the turbine.

4. The water usage monitor of claim 1, wherein fewer than 30% of the turbine blades are positioned in the fluid flow passage at any instant in time during operation of the water usage monitor.

5. The water usage monitor of claim 1, wherein the fluid inlet has a cross-sectional area substantially equal to a cross-sectional area of the fluid outlet.

6. The water usage monitor of claim 1, comprising only a single fluid flow path through the housing.

7. The water usage monitor of claim 1, wherein the at least one sensor is a pressure sensor configured to measure pressure in the fluid flow path.

8. The water usage monitor of claim 1, wherein the at least one sensor is a turbine that also functions as the power generator.

9. The water usage monitor of claim 1, wherein the voltage generated by the power generator is used to calculate flow rate through the fluid flow path and to power the at least one sensor and the generator.

10. A water monitoring system comprising:
one or more network hubs;
a plurality of the water usage monitors, each of the water usage monitors comprising:
a housing having:
a fluid flow path;
a fluid inlet in fluid communication with the fluid flow path and configured to facilitate fluid communication between a fluid source and the fluid flow path;
a fluid outlet in fluid communication with the fluid flow path at an end of the fluid flow path opposite the fluid inlet, the fluid outlet facilitating outflow of fluid from the fluid flow path to an exterior of the housing; and
a dry housing interior fluidly isolated from the fluid flow path;
a power generator positioned at least partially in the fluid flow path, the power generator configured to generate a voltage when fluid flows through the fluid flow path from the fluid inlet;
at least one sensor positioned at least partially within the dry housing and configured to measure at least one characteristic of a fluid flowing through the fluid flow path; and
a signal generator operably connected to the power generator and to the at least one sensor, the signal generator configured transmit signals from the power generator and from the at least one sensor to a remote processor;
wherein the power generator is configured to power both the at least one sensor and the signal generator in response to fluid flow through the fluid flow path, wherein the power generator is configured to output signals usable for calculating flow rate of fluid through the flow path, and wherein the power generator is configured to generate a voltage indicative of fluid flow rate through the fluid flow path; and
a network of distributed servers hosted on the internet and configured to bilaterally communicate with the plurality of water usage monitors through the one or more network hubs;
wherein:
the plurality of water usage monitors are configured to wirelessly communicate with each other and with the one or more network hubs;
at least two of the plurality of water usage monitors are configured to wirelessly communicate flow data to the one or more network hubs; and
the network of distributed servers is configured to calculate water flow rate from the flow data communicated from the at least two water usage monitors.

11. The water monitoring system of claim 10, wherein each of the at least two water usage monitors is located in a different geographic location from the other.

12. The water monitoring system of claim 11, wherein each of the plurality of water usage monitors includes a unique identifier configured to be scanned or otherwise communicated to the one or more network hubs, wherein the unique identifier indicates the location of the water usage monitor.

13. The water monitoring system of claim 10, wherein each of the at least two water usage monitors is configured to wirelessly communicate live flow data to the one or more network hubs.

14. The water monitoring system of claim 10, wherein the plurality of water usage monitors are configured to communicate raw data reflective of voltage generated by the power generator to the network of distributed servers via the one or more network hubs, wherein the network of distributed servers is configured to calculate flow rate through the water usage monitors based on the raw data, and wherein no calculations of flow rate are performed by the water usage monitors or by the one or more network hubs.

* * * * *